United States Patent
Li et al.

(10) Patent No.: US 12,355,538 B2
(45) Date of Patent: Jul. 8, 2025

(54) COMMUNICATION APPARATUS AND ELECTRONIC DEVICE

(71) Applicant: Huawei Technologies Co., Ltd., Shenzhen (CN)

(72) Inventors: Zhi Li, Shenzhen (CN); Jian Liang, Shanghai (CN); Peng Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/446,082

(22) Filed: Aug. 8, 2023

(65) Prior Publication Data

US 2023/0387998 A1    Nov. 30, 2023

Related U.S. Application Data

(63) Continuation of application No. PCT/CN2021/076321, filed on Feb. 9, 2021.

(51) Int. Cl.
*H04L 5/00*    (2006.01)
*H04B 7/0413*  (2017.01)
*H04B 7/06*    (2006.01)

(52) U.S. Cl.
CPC ........ *H04B 7/0682* (2013.01); *H04B 7/0413* (2013.01); *H04L 5/0033* (2013.01)

(58) Field of Classification Search
CPC .. H01Q 1/24; H01Q 3/34; H01Q 3/36; H01Q 21/24; H04B 1/00; H04B 1/04; H04B 1/46; H04B 7/06; H04B 7/08; H04B 7/0413; H04B 7/0456; H04B 7/0682; H04L 5/00; H04L 5/0033; H04L 27/00; H04L 27/22; H04W 16/14; H04W 16/28; H04W 76/16; H04W 88/08; H04W 88/10
USPC ................ 375/219, 260, 262, 267, 295, 316
See application file for complete search history.

(56) References Cited

U.S. PATENT DOCUMENTS

| | | | |
|---|---|---|---|
| 10,440,584 B1 | 10/2019 | Labadie et al. | |
| 2016/0226570 A1* | 8/2016 | Nicholls | H04B 7/0897 |
| 2018/0212315 A1 | 7/2018 | Patel et al. | |
| 2020/0127725 A1 | 4/2020 | Paramesh et al. | |
| 2020/0252115 A1* | 8/2020 | Paramesh | H04B 1/18 |
| 2020/0366532 A1* | 11/2020 | Brunel | H04L 27/2646 |

* cited by examiner

*Primary Examiner* — Shawkat M Ali
(74) *Attorney, Agent, or Firm* — Slater Matsil, LLP

(57) ABSTRACT

A communication apparatus and an electronic device for implementing multi-carrier aggregation are provided. The communication apparatus includes a transceiver and an antenna array. The transceiver is coupled to a plurality of radio frequency channels, and the plurality of radio frequency channels are coupled to all antenna units in the antenna array in a one-to-one manner. Each of the plurality of radio frequency channels includes a phase shifter, and the phase shifter is configured to set a phase of a radio frequency signal transmitted in the radio frequency channel. The antenna array includes a plurality of first antenna units and a plurality of second antenna units. The plurality of first antenna units are configured to transmit a plurality of radio frequency signals of a first band, to form a first carrier signal pointing to a first direction.

20 Claims, 21 Drawing Sheets

TO FIG. 10B

Example b: inter-band CA mode

Example b: inter-band CA mode

COMMUNICATION APPARATUS AND ELECTRONIC DEVICE

CROSS-REFERENCE TO RELATED APPLICATIONS

This application is a continuation of International Application No. PCT/CN2021/076321, filed on Feb. 9, 2021, the disclosure of which is hereby incorporated by reference in its entirety.

TECHNICAL FIELD

This application relates to the field of communication technologies, and in particular, to a communication apparatus and an electronic device.

BACKGROUND

A phased array technology can implement more centralized energy transmission and better signal directionality, and is gradually implemented in the commercial field, especially in a fifth generation mobile communication (5G communication) system.

How to further improve spectrum resource utilization of a phased array, improve user experience, and achieve a higher channel transmission rate and networking efficiency is a technical problem that needs to be resolved.

SUMMARY

Embodiments of this application provide a communication apparatus and an electronic device for implementing multi-carrier aggregation.

According to a first aspect, an embodiment of this application provides a communication apparatus, where the communication apparatus is configured to transmit a multi-carrier signal, and the communication apparatus includes a transceiver and an antenna array. The transceiver is coupled to a plurality of radio frequency channels, the plurality of radio frequency channels are coupled to all antenna units in the antenna array in a one-to-one manner. Each of the plurality of radio frequency channels includes a phase shifter, and the phase shifter is configured to set a phase of a radio frequency signal transmitted in the radio frequency channel. The antenna array includes a plurality of first antenna units and a plurality of second antenna units. The plurality of first antenna units are respectively configured to transmit a plurality of radio frequency signals of a first band, to form a first carrier signal pointing to a first direction. The plurality of second antenna units are respectively configured to transmit a plurality of radio frequency signals of a second band, to form a second carrier signal pointing to a second direction. The multi-carrier signal includes the first carrier signal and the second carrier signal.

In the communication apparatus provided in the first aspect, the antenna unit in the antenna array is divided into two parts, that is, the plurality of first antenna units and the plurality of second antenna units. In an inter-band CA scenario, the plurality of first radio frequency signals transmitted by the plurality of first antenna units are for carrier aggregation, to form a first carrier signal. The plurality of second radio frequency signals transmitted by the plurality of second antenna units are for carrier aggregation, to form a second carrier signal. Carrier aggregation of different bands can be implemented through the communication apparatus provided in the first aspect, to support a larger transmission bandwidth, improve networking efficiency, and improve user experience.

In a possible design, the multi-carrier signal may be an inter-band carrier aggregation signal.

In addition, the antenna unit in the antenna array may be used in both the inter-band CA scenario and a non-inter-band CA scenario. Therefore, hardware resource consumption of implementing inter-band CA through the communication apparatus provided in the first aspect is low. In the non-inter-band CA scenario, all antenna units in the antenna array operate. Therefore, a phenomenon that hardware resources are wasted to adapt to the inter-band CA scenario does not occur. In the communication apparatus provided in the first aspect, inter-band CA and non-inter-band CA may be implemented through one antenna array.

The first band and the second band may be located in different but overlapping frequency ranges of bands for commercial use. Alternatively, the first band and the second band may be located in a same frequency range. Alternatively, the first band and the second band may be located in frequency ranges that are different and that are not overlapping.

In a possible design, the first direction points to a first network device, and the second direction points to a second network device.

The network device may be a device that provides a wireless network service, for example, may be a base station.

According to the foregoing solution, the communication apparatus can communicate with the first network device in the first direction on the first band, and communicate with the second network device in the second direction on the second band.

In the non-inter-band CA scenario, the plurality of second antenna units may be further configured to transmit the plurality of radio frequency signals of the first band, and the plurality of first antenna units may be further configured to transmit the plurality of radio frequency signals of the first band, to form a third carrier signal pointing to the first direction.

According to the foregoing solution, the plurality of first antenna units and the plurality of second antenna units in the antenna array may further support the communication apparatus in communicating with the first network device in the first direction on the first band in the non-inter-band CA scenario.

In the non-inter-band CA scenario, the plurality of first antenna units may be further configured to transmit the plurality of radio frequency signals of the second band, and the plurality of second antenna units may be further configured to transmit the plurality of radio frequency signals of the second band, to form a fourth carrier signal pointing to the second direction.

According to the foregoing solution, the plurality of first antenna units and the plurality of second antenna units in the antenna array may further support the communication apparatus in communicating with the second network device in the second direction on the second band in the non-inter-band CA scenario.

In a possible design, the transceiver in the communication apparatus provided in the first aspect may include a power splitting and combining network and a signal processing unit. The power splitting and combining network is coupled to the plurality of radio frequency channels, and is configured to connect a plurality of first radio frequency channels to the signal processing unit, and connect a plurality of second radio frequency channels to the signal processing unit. The plurality of first radio frequency channels are a plurality of radio frequency channels respectively coupled to the plurality of first antenna units, and the plurality of second radio frequency channels are a plurality of radio frequency channels respectively coupled to the plurality of second antenna units.

According to the foregoing solution, different radio frequency channels may be connected to the signal processing unit over the power splitting and combining network, so that the communication apparatus can adapt to the inter-band CA scenario and the non-inter-band CA scenario.

Further, the signal processing unit may include a first signal processing unit and a second signal processing unit, where the first signal processing unit may include a first sent signal processing unit and a first received signal processing unit, and the second signal processing unit may include a second sent signal processing unit and a second received signal processing unit.

According to the foregoing solution, the first sent signal processing unit may process a signal to be sent by the first antenna unit, and the first received signal processing unit may process a signal received by the first antenna unit. The second sent signal processing unit may process a signal to be sent by the second antenna unit, and the second received signal processing unit may process a signal received by the second antenna unit.

Specifically, in the communication apparatus provided in the first aspect, specific structures of the radio frequency channel, the power splitting and combining network, and the signal processing unit may be implemented in plurality of manners.

Implementation 1

In a possible design, the power splitting and combining network may include a first power splitter-combiner, a second power splitter-combiner, and a switch. The first power splitter-combiner is configured to implement power splitting and combining on the plurality of first radio frequency channels. The second power splitter-combiner is configured to implement power splitting and combining on the plurality of second radio frequency channels. The switch is configured to control coupling and disconnection between the first power splitter-combiner and the signal processing unit, and control coupling or disconnection between the second power splitter-combiner and the signal processing unit.

In Implementation 1, the first band and the second band may be located in different but overlapping frequency ranges of bands for commercial use. Alternatively, the first band and the second band may be located in a same frequency range.

Specifically, the switch may be configured to: control connection and disconnection between the first power splitter-combiner and the first signal processing unit; control connection and disconnection between the first power splitter-combiner and the second signal processing unit; control connection and disconnection between the second power splitter-combiner and the first signal processing unit; and control connection and disconnection between the second power splitter-combiner and the second signal processing unit.

According to the foregoing solution, the first radio frequency channel and the second radio frequency channel may be connected to or disconnected from different signal processing units through the switch, so that the power splitting and combining network flexibly adapts to the inter-band CA scenario and the non-inter-band CA scenario.

In a possible design, the switch may include a switch unit, a third power splitter-combiner, and a fourth power splitter-combiner. The switch unit may include a first switch unit and a second switch unit, where the first switch unit is configured to connect the first power splitter-combiner to a third power splitter-combiner or a fourth power splitter-combiner, and the second switch unit is configured to connect the second power splitter-combiner to the third power splitter-combiner or the fourth power splitter-combiner. The third power splitter-combiner may be configured to connect the switch unit to the first signal processing unit. The fourth power splitter-combiner may be configured to connect the switch unit to the second signal processing unit.

According to the foregoing solution, through switching of the first switch unit, connection and disconnection between the first power splitter-combiner and the first signal processing unit may be controlled, and connection and disconnection between the first power splitter-combiner and the second signal processing unit may be controlled. Through switching of the second switch unit, connection and disconnection between the second power splitter-combiner and the first signal processing unit may be controlled, and connection and disconnection between the second power splitter-combiner and the second signal processing unit may be controlled.

In this case, through switching of the switch unit in the power splitting and combining network, the power splitting and combining network may be enabled, in the inter-band CA scenario, to connect the plurality of first radio frequency channels to the first signal processing unit and connect the plurality of second radio frequency channels to the second signal processing unit, thereby implementing management of two independent beams. Through switching of the switch unit in the power splitting and combining network, the power splitting and combining network may be enabled, in the non-inter-band CA scenario, to connect both the plurality of first radio frequency channels and the plurality of second radio frequency channels to the first signal processing unit (to communicate with the first network device on the first band), or to the second signal processing unit (to communicate with the second network device on the second band), thereby implementing management of one beam.

In a possible design, each of the plurality of radio frequency channels may include a front-end device and the phase shifter. The front-end device includes a low noise amplifier LNA and a power amplifier PA that are connected in parallel, where the LNA is configured to amplify a received signal of the antenna array, and the PA is configured to amplify a sent signal of the antenna array. The phase shifter is coupled to the front-end device, and is configured to shift the phase of the radio frequency signal transmitted in the radio frequency channel.

According to the foregoing solution, the LNA may be configured to amplify the received signal of the antenna array, and the PA may be configured to amplify the sent signal of the antenna array. The phase shifter is coupled to the front-end device, and is configured to shift the phase of the radio frequency signal transmitted in the radio frequency channel. For example, in the inter-band CA scenario, the phase shifter in the first radio frequency channel is respectively configured to set phases of the plurality of radio frequency signals of the first band transmitted in the plurality of first radio frequency channels, to form a first carrier signal. The phase shifter in the second radio frequency channel is respectively configured to set phases of the plurality of radio frequency signals of the second band transmitted in the plurality of second radio frequency channels, to form a second carrier signal.

In a possible design, the first sent signal processing unit may include a first transmit amplifier, and the first received signal processing unit may include a first receive amplifier. The second sent signal processing unit may include a second transmit amplifier, and the second received signal processing unit may include a second receive amplifier.

The first transmit amplifier and the first receive amplifier may be bidirectionally connected in parallel. The second transmit amplifier and the second receive amplifier may be bidirectionally connected in parallel. The transmit amplifier in the signal processing unit is configured to amplify and drive a transmitted radio frequency signal. The receive amplifier in the signal processing unit is configured to amplify and drive a received radio frequency signal.

Further, the first sent signal processing unit may further include a first up-converter connected in series to the first transmit amplifier. The first received signal processing unit may further include a first down-converter connected in series to the first receive amplifier. The second sent signal processing unit may further include a second up-converter connected in series to the second transmit amplifier. The second received signal processing unit may further include a second down-converter connected in series to the second receive amplifier.

The up-converter may include a mixer, a phase locked loop, and the like, and the down-converter may also include a mixer, a phase locked loop, and the like.

According to the foregoing solution, the up-converter may be configured to perform up-conversion on an intermediate frequency/low frequency signal, to obtain a radio frequency signal. The down-converter may be configured to perform down-conversion on a radio frequency signal to obtain an intermediate frequency/low frequency signal, so that the communication apparatus provides an intermediate frequency interface externally.

Implementation 2

In a possible design, each of the plurality of radio frequency channels may include a first switch, a first input channel, a second input channel, a first output channel, a second output channel, and the phase shifter. The first switch is configured to switch on the first input channel or the second input channel, and switch on the first output channel or the second output channel. The first input channel includes a first LNA and a first mixer that are connected in series. The second input channel includes a second LNA and a second mixer that are connected in series. The first output channel includes a first PA and a third mixer that are connected in series. The second output channel includes a second PA and a fourth mixer that are connected in series. The phase shifter is coupled to an input end of each mixer in the radio frequency channel.

In Implementation 2, the first band and the second band may be located in frequency ranges that are different and that are not overlapping.

Specifically, the first LNA and the first mixer are configured to receive and process a radio frequency signal of the first band. The second LNA and the second mixer are configured to receive and process a radio frequency signal of the second band. The first PA and the third mixer are configured to process and send the radio frequency signal of the first band. The second PA and the fourth mixer are configured to process and send the radio frequency signal of the second band.

In a possible design, the power splitting and combining network may include: a first power splitter-combiner, configured to implement power splitting and combining on each input channel of the plurality of first radio frequency channels; a second power splitter-combiner, configured to implement power splitting and combining on each input channel of the plurality of second radio frequency channels; a third power splitter-combiner, configured to implement power splitting and combining on each output channel of the plurality of first radio frequency channels; a fourth power splitter-combiner, configured to implement power splitting and combining on each output channel of the plurality of second radio frequency channels; and a second switch, configured to control connection between the first power splitter-combiner and the first received signal processing unit, control connection between the third power splitter-combiner and the first sent signal processing unit, control connection between the second power splitter-combiner and the first received signal processing unit or the second received signal processing unit, and control connection between the fourth power splitter-combiner and the first sent signal processing unit or the second sent signal processing unit.

According to the foregoing solution, through the second switch, the first power splitter-combiner may be coupled to the first received signal processing unit, and the third power splitter-combiner may be coupled to the first sent signal processing unit. Moreover, the second power splitter-combiner may be coupled to the first received signal processing unit or the second received signal processing unit, and the fourth power splitter-combiner may be coupled to the first sent signal processing unit or the second sent signal processing unit. In this way, the power splitting and combining network flexibly adapts to the inter-band CA scenario and the non-inter-band CA scenario.

For example, in the inter-band CA scenario, the second switch may couple the second power splitter-combiner to the second received signal processing unit, and couple the fourth power splitter-combiner to the second sent signal processing unit. In this case, the first sent signal processing unit and the first received signal processing unit may be configured to process a signal of the first band transmitted by the first antenna unit, and the second sent signal processing unit and the second received signal processing unit may be configured to process a signal of the second band transmitted by the second antenna unit, thereby implementing management of two independent beams.

For example, in the non-inter-band CA scenario, the second switch may couple the second power splitter-combiner to the first received signal processing unit, and couple the fourth power splitter-combiner to the first sent signal processing unit. In this case, the first sent signal processing unit and the first received signal processing unit may be configured to process a signal of the first band or a signal of the second band transmitted by the antenna array, thereby implementing management of one beam.

Further, the second switch may include a first switch unit, a second switch unit, a fifth power splitter-combiner, and a sixth power splitter-combiner.

The first switch unit may be coupled to the second power splitter-combiner, the fifth power splitter-combiner, and the second received signal processing unit, and is configured to connect the second power splitter-combiner to the fifth power splitter-combiner, or connect the second power splitter-combiner to the second received signal processing unit. The second switch unit may be coupled to the fourth power splitter-combiner, the sixth power splitter-combiner, and the second sent signal processing unit, and is configured to connect the fourth power splitter-combiner to the sixth power splitter-combiner, or connect the fourth power splitter-combiner to the second sent signal processing unit.

In addition, the fifth power splitter-combiner may be coupled to the first power splitter-combiner, the first switch unit, and the first received signal processing unit, and is configured to connect the first power splitter-combiner and the second power splitter-combiner to the first received signal processing unit, or connect the first power splitter-combiner to the first received signal processing unit. The sixth power splitter-combiner may be coupled to the third power splitter-combiner, the second switch unit, and the first sent signal processing unit, and is configured to connect the third power splitter-combiner and the fourth power splitter-combiner to the first sent signal processing unit, or connect the third power splitter-combiner to the first sent signal processing unit.

In a possible design, the first received signal processing unit may include a first amplifier, and the first sent signal processing unit may include a second amplifier. The second received signal processing unit may include a third amplifier, and the second sent signal processing unit may include a fourth amplifier.

An input end of the first amplifier is coupled to the fifth power splitter-combiner, an output end of the second amplifier is coupled to the sixth power splitter-combiner, and an output end of the first amplifier is coupled to an input end of the second amplifier. An input end of the third amplifier is coupled to the fifth power splitter-combiner, an output end of the fourth amplifier is coupled to the sixth power splitter-combiner, and an output end of the third amplifier is coupled to an input end of the fourth amplifier.

According to the foregoing solution, the amplifier in the signal processing unit may be configured to amplify and drive a transmitted radio frequency signal.

In addition, in Implementation 2, the first received signal processing unit may further include a first down-converter, and the second received signal processing unit may further include a second down-converter. The first sent signal processing unit may further include a first up-converter, and the second sent signal processing unit may further include a second up-converter.

It should be understood that if the signal processing unit does not include the up-converter and the down-converter, the communication apparatus provides a radio frequency interface externally. If the signal processing unit includes the up-converter and the down-converter, the communication apparatus provides an intermediate frequency/low frequency interface externally.

In addition, in a possible design, in the communication apparatus provided in the first aspect, the antenna array may further include a third antenna unit, where the third antenna unit is configured to isolate the plurality of first antenna units from the plurality of second antenna units.

According to the foregoing solution, when the antenna units are arranged as above, in the non-inter-band CA scenario, some antenna units in the antenna array may be selected to form an array to operate, so as to form the foregoing third carrier signal or the foregoing fourth carrier signal. In the inter-band CA scenario, because spatial isolation through the third antenna unit is physically added between the plurality of first antenna units and the plurality of second antenna units, isolation between signals is further improved during operation.

According to a second aspect, an embodiment of this application further provides a radio frequency chip module. The radio frequency chip module includes a radio frequency chip and a package substrate, where the radio frequency chip is fixed on the package substrate. The radio frequency chip includes the transceiver and the plurality of radio frequency channels provided in any one of the first aspect and the possible designs of the first aspect. The package substrate includes the antenna array provided in any one of the first aspect and the possible designs of the first aspect.

According to a third aspect, an embodiment of this application further provides an electronic device. The electronic device includes a memory, a processor, and the communication apparatus provided in any one of the first aspect and the possible designs of the first aspect.

In addition, for technical effects brought by any one of the second aspect to the third aspect and the possible designs of the second aspect to the third aspect, refer to technical effects brought by different designs of the first aspect. Details are not described herein again.

DETAILED DESCRIPTION OF ILLUSTRATIVE EMBODIMENTS

The following further describes in detail embodiments of this application with reference to the accompanying drawings.

It should be noted that, in embodiments of this application, "a plurality of" means two or more. In the descriptions of this application, terms such as "first" and "second" are merely used for distinction and description, and should not be understood as an indication or implication of relative importance, or as an indication or implication of an order.

A high-frequency millimeter wave has rich spectrum resources and very high bandwidth. It is applicable to application scenarios with large bandwidth and large data rates, and is widely used in fields such as 5G communication, microwave backhaul, and indoor short-range communication.

However, the high-frequency millimeter wave has a relatively large space loss in a channel, and its transmission characteristic is closer to direct transmission. Because more centralized energy transmission and a better signal directivity can be achieved via a phased array technology, the phased array technology is usually used when a high-frequency millimeter wave communication is implemented.

Figure 1:
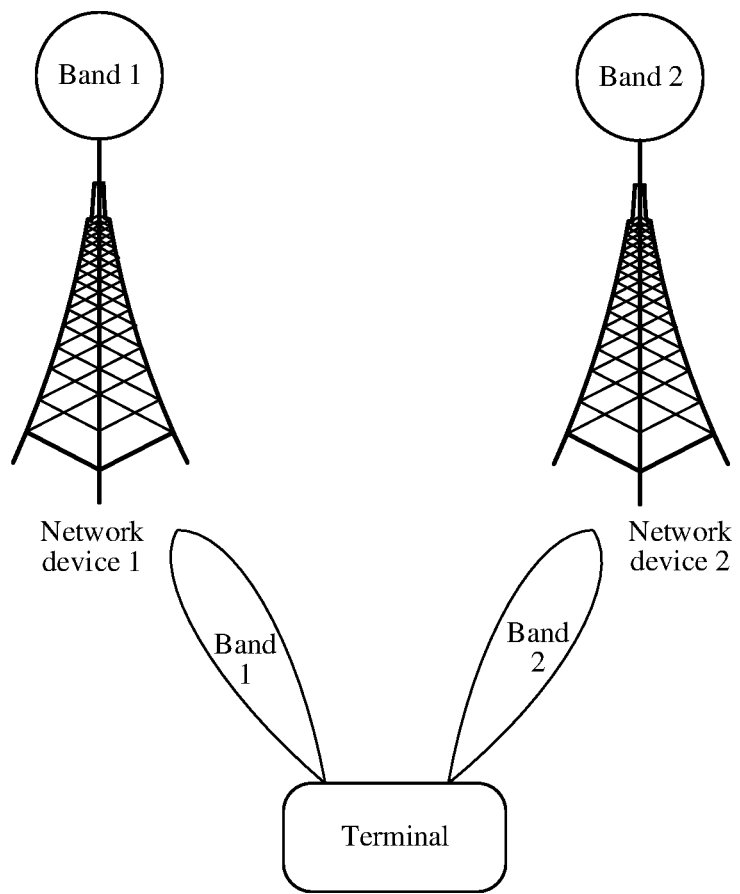
FIG. 1 is a schematic diagram of an inter-band CA scenario according to an embodiment of this application.

The high-frequency millimeter wave has a plurality of potential operating frequency ranges, for example, 24.25 GHz to 29.5 GHz, 37.0 GHz to 43.5 GHz, and 57 GHz to 71 GHz. Each frequency range may include a plurality of bands. In actual application, there are scenarios in which an operator deploys network devices in different bands at different locations. As shown in FIG. 1, a terminal uses a band 1 to communicate with a network device 1, and uses a band 2 to communicate with a network device 2. The network device 1 and the network device 2 are located in different directions of the terminal.

For the scenario shown in FIG. 1, how the terminal implements carrier aggregation in one direction on the band 1 and carrier aggregation in the other direction on the band 2, that is, how to implement inter-band carrier aggregation (CA), is an urgent problem to be solved.

Figure 2:
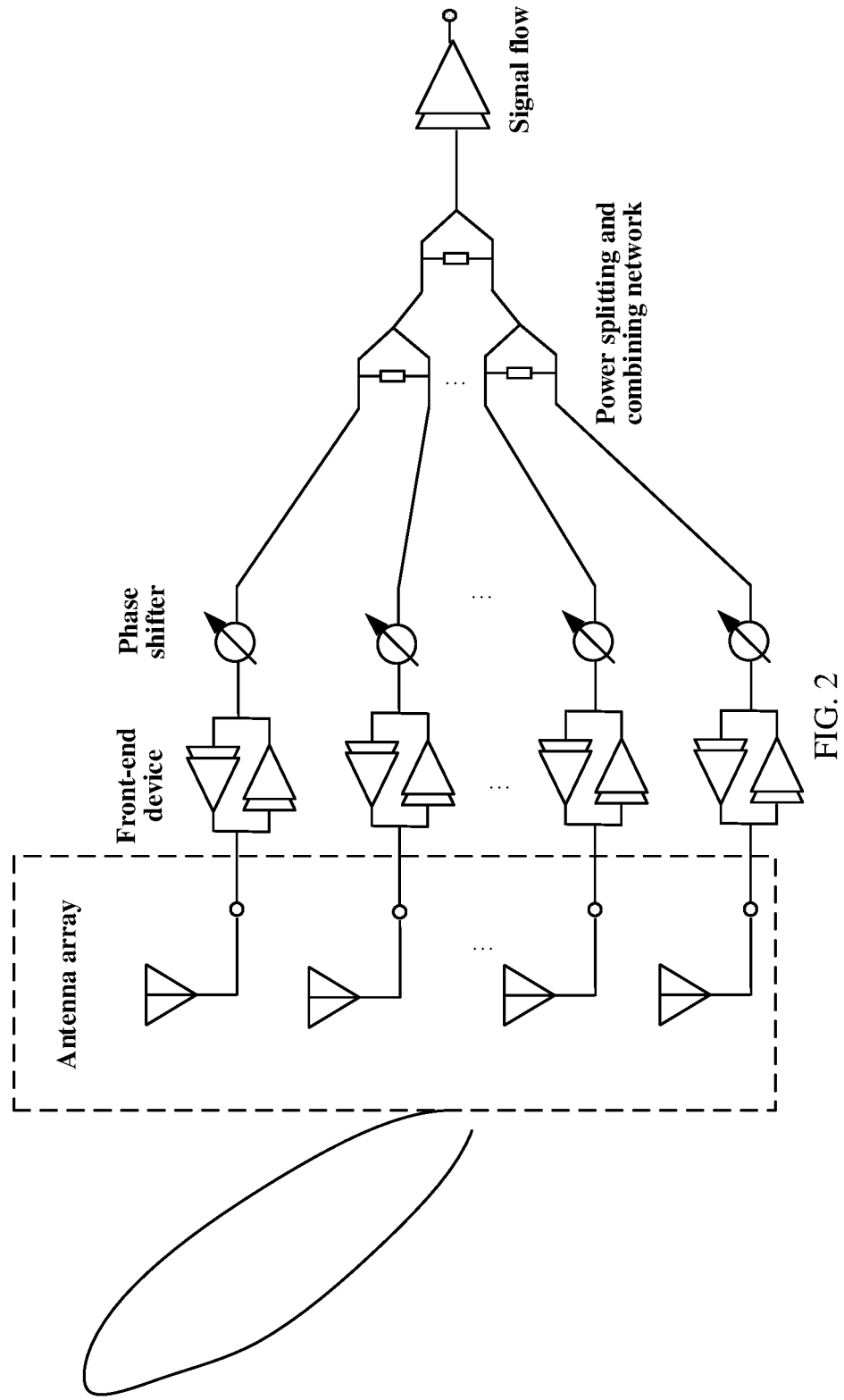
FIG. 2 is a schematic diagram of a structure of a phased array system according to an embodiment of this application.

FIG. 2 is a schematic diagram of a structure of a phased array system. The phased array system includes a plurality of branches and a power splitting and combining network. Each branch includes an antenna unit, a front-end device, and a phase shifter. A plurality of antenna units form an antenna array. The antenna unit is configured to send and receive a signal, the front-end device is configured to amplify a signal, and the phase shifter is configured to set a phase of a radio frequency signal transmitted on a corresponding branch. When the phased array needs to point to a specific direction and implement a beam in the specific direction, a phase shifter in the phased array may perform phase shift on the signal of the corresponding branch, to obtain a pattern of the specific direction.

The phased array system shown in FIG. 2 may support beam management in one direction. To adapt to the inter-band CA scenario shown in FIG. 1, a phased array system shown in FIG. 3A and FIG. 3B may be used.

The phased array system includes: an antenna array 1 and a corresponding high-frequency transceiver 1, and an antenna array 2 and a corresponding high-frequency transceiver 2. When the phased array system supports the inter-band CA, the antenna array 1 and the high-frequency transceiver 1 transmit a signal flow 1 of a band 1, and the antenna array 2 and the high-frequency transceiver 2 transmit a signal flow 2 of a band 2. In a non-inter-band CA scenario, when the band 1 operates, only the antenna array 1 and the high-frequency transceiver 1 perform transmission; and when the band 2 operates, only the antenna array 2 and the high-frequency transceiver 2 perform transmission.

Figure 3A:
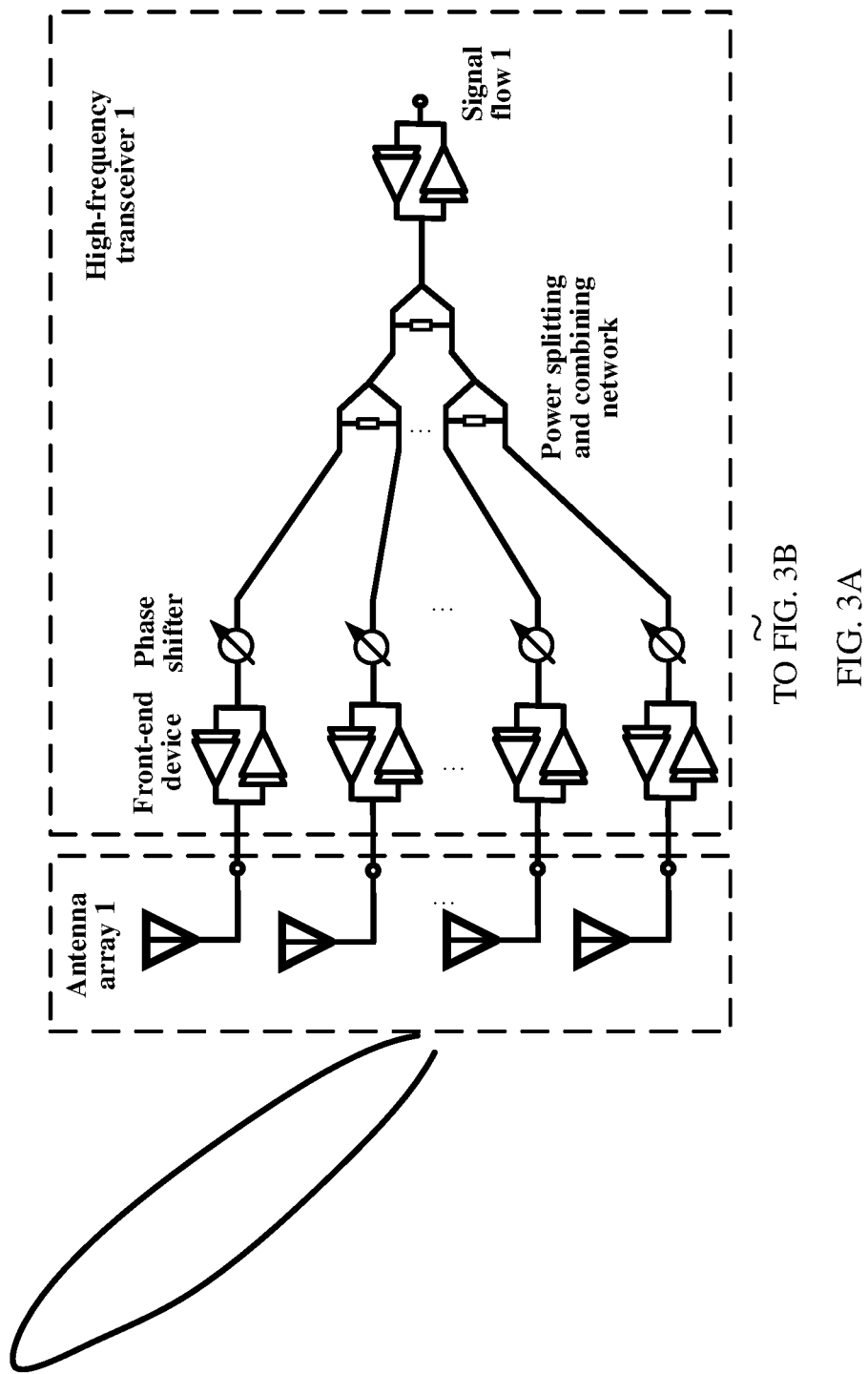
FIG. 3A and FIG. 3B are schematic diagrams of a structure of another phased array system according to an embodiment of this application.
Figure 3B:
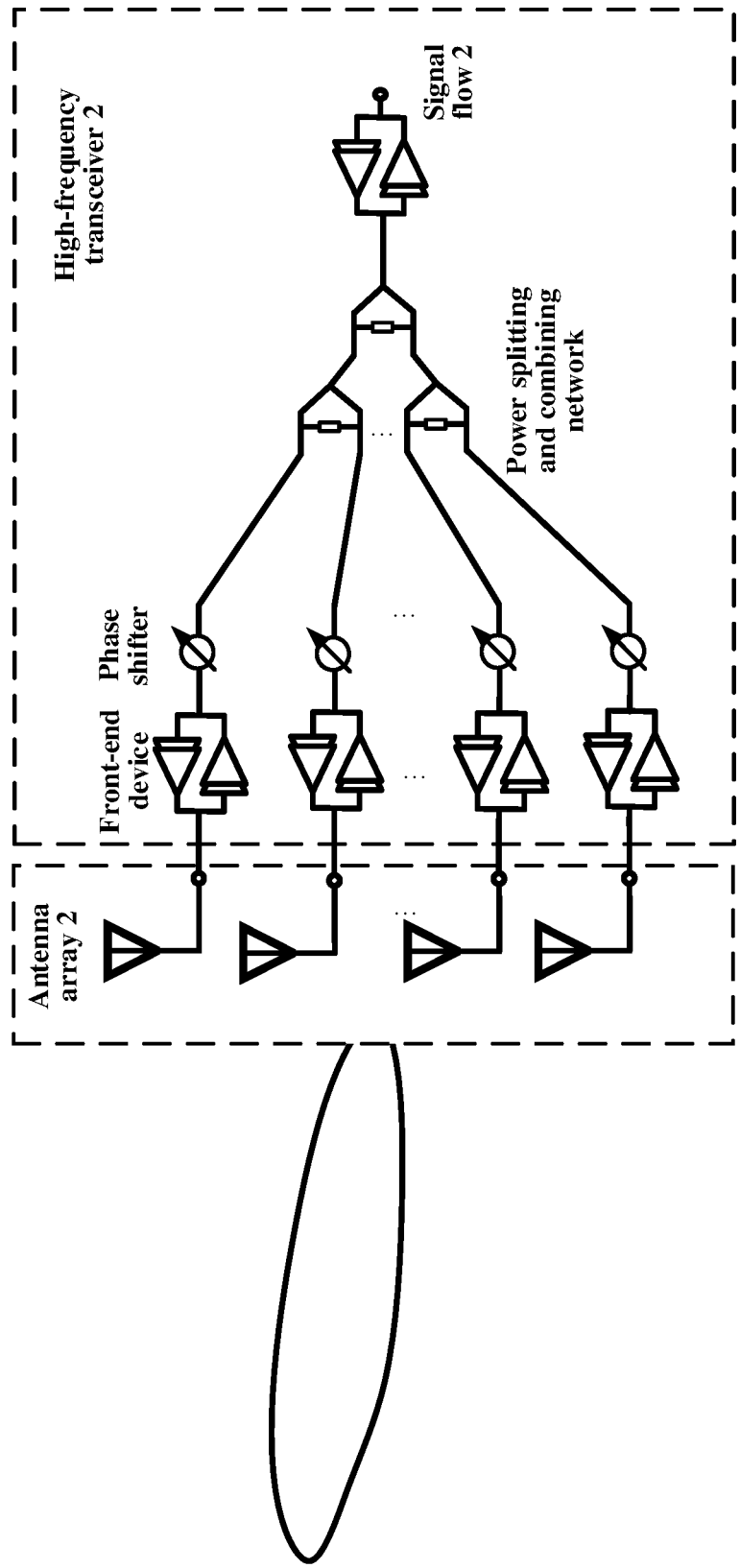

When the phased array system shown in FIG. 3A and FIG. 3B is used to implement the inter-band CA, two groups of antenna arrays and two groups of high-frequency transceivers are required, hardware resource consumption is large, and costs of implementing the inter-band CA scenario is very high. In the non-inter-band CA scenario, only one antenna array and one high-frequency transceiver operate, resulting in a waste of hardware resources.

Figure 4:
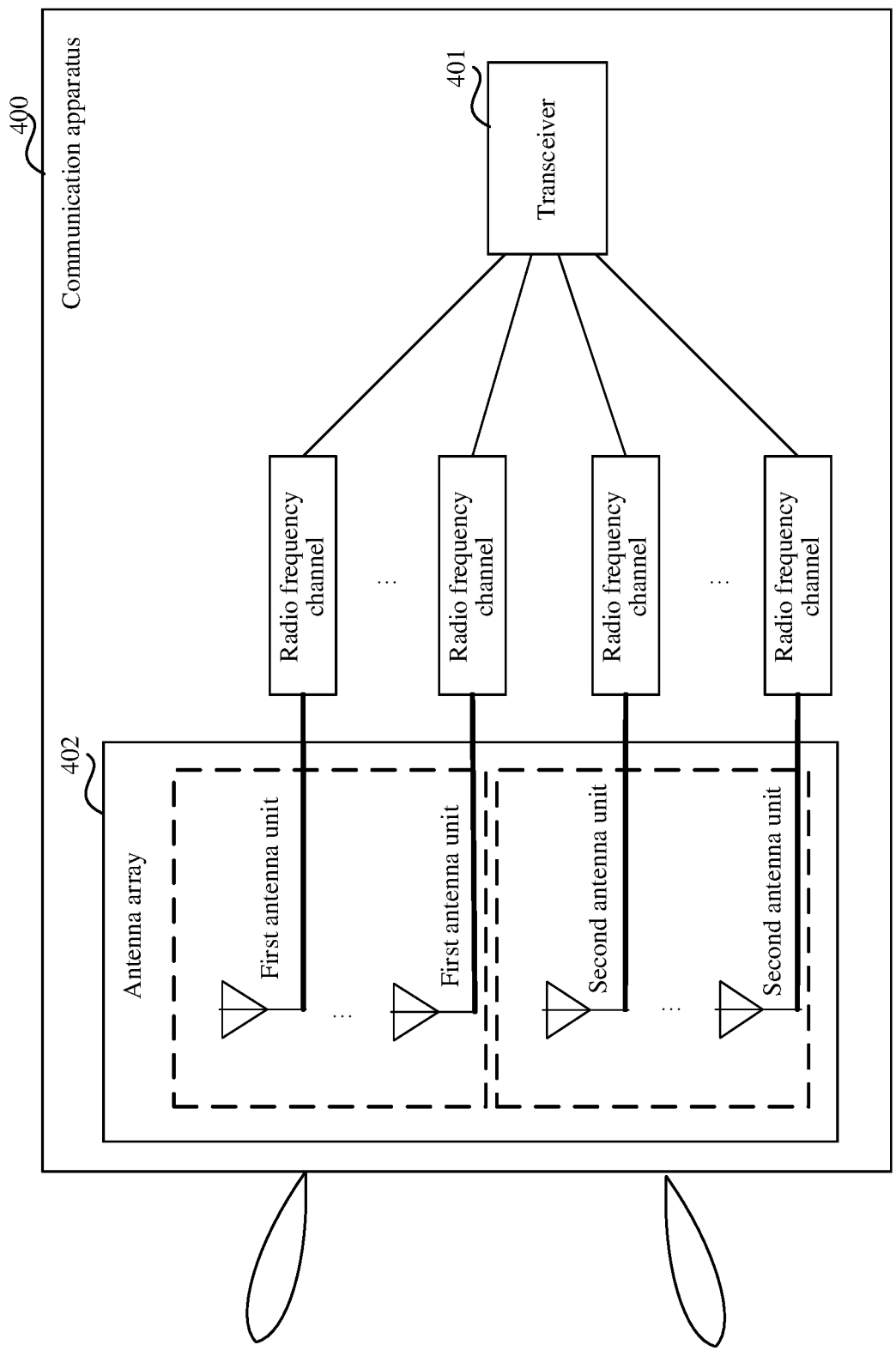
FIG. 4 is a schematic diagram of a structure of a first communication apparatus according to an embodiment of this application.

Further, to implement the inter-band CA, a communication apparatus 400 shown in FIG. 4 may alternatively be used. The communication apparatus 400 may be considered as an apparatus in the terminal, and is configured to support the terminal in communicating with the network device in the inter-band CA scenario shown in FIG. 1. That is, the communication apparatus 400 is configured to transmit an inter-band carrier aggregation signal.

A device that uses a wireless network service may be referred to as a terminal for short. The terminal can establish a connection to a network device, and provides a specific wireless communication service for a user based on a service of the network device. It should be understood that, because the terminal has a closer relationship with the user, the terminal sometimes is also referred to as user equipment (UE) or a subscriber unit (SU). In addition, compared with a base station that is generally placed at a fixed location, the terminal usually moves along with the user, and sometimes is also referred to as a mobile station (MS). In addition, some network devices such as a relay node (RN) or a wireless router sometimes may also be considered as terminals because the network devices have a UE identity or belong to a user.

Specifically, the terminal may be a mobile phone, a tablet computer, a laptop computer, a wearable device (for example, a smart watch, a smart band, a smart helmet, or smart glasses), or another device that has a wireless access capability, for example, an intelligent vehicle, and various Internet of Things (IoT) devices including various smart home devices (such as a smart meter and a smart home appliance) and smart city devices (such as a security or monitoring device and an intelligent road transportation facility).

Specifically, the network device may be a device that provides a wireless network service. The device that provides the wireless network service is a device that is a part of a wireless communication network, and may be referred to as a network equipment or a network element for short. The network device generally belongs to operators (for example, China Mobile and Vodafone) or infrastructure providers (for example, China Tower), and is operated or maintained by these vendors. The network device may be further classified into a radio access network (RAN) device and a core network (CN) device. A typical RAN device includes a base station (BS).

It should be understood that the base station sometimes may be alternatively referred to as a wireless access point (AP) or a transmission reception point (TRP). Specifically, the base station may be a generation NodeB (gNB) in a 5G new radio (NR) system, or an evolved NodeB (eNB) in a 4G long term evolution (LTE) system. The base station may be classified into a macro base station and a micro base station based on different physical forms or transmit powers of the base stations. A micro base station is also sometimes referred to as a small base station or a small cell.

Specifically, the communication apparatus 400 may include a transceiver 401 and an antenna array 402. The transceiver 401 is coupled to a plurality of radio frequency channels, and the plurality of radio frequency channels are coupled to all antenna units in the antenna array 402 in a one-to-one manner. Each of the plurality of radio frequency channels includes a phase shifter, and the phase shifter is configured to set a phase of a radio frequency signal transmitted in the radio frequency channel. The antenna array 402 includes a plurality of first antenna units and a plurality of second antenna units. The plurality of first antenna units are configured to transmit a plurality of radio frequency signals of a first band, to form a first carrier signal pointing to a first direction. The plurality of second antenna units are configured to transmit a plurality of radio frequency signals of a second band, to form a second carrier signal pointing to a second direction. The inter-band carrier aggregation signal includes the first carrier signal and the second carrier signal.

Carrier aggregation is a technology that aggregates at least two component carriers (CC) together to support a larger transmission bandwidth. For efficient utilization of fragmented spectrums, carrier aggregation supports aggregation of component carriers in different ranges of band, or aggregation of adjacent or non-adjacent component carriers in a same range of band.

For example, carrier aggregation may support aggregation of two or three adjacent CCs in the band 1. Alternatively, carrier aggregation may support aggregation of two adjacent CCs in the band 1 and one CC in the band 2. Alternatively, carrier aggregation may support aggregation of two non-adjacent CCs in the band 1 and one CC in the band 2. Alternatively, carrier aggregation may support aggregation of one CC in the band 1 and one CC in the band 2.

The first band and the second band may be millimeter wave bands. For example, the first band and the second band may be two different bands, for example, the band 1 and the band 2 respectively, in a frequency range of 24.25 GHz to 29.5 GHz. For another example, the first band may be the band 1 in a frequency range of 37.0 GHz to 43.5 GHz, and the second band may be the band 2 in a frequency range of 57 GHz to 71 GHz.

It is not hard to see that, in the communication apparatus 400, the antenna unit in the antenna array 402 is divided into two parts, that is, the plurality of first antenna units and the plurality of second antenna units. In the inter-band CA scenario, the plurality of first radio frequency signals transmitted by the plurality of first antenna units are for carrier aggregation, to form the first carrier signal in the first direction. The plurality of second radio frequency signals transmitted by the plurality of second antenna units are for carrier aggregation, to form the second carrier signal in the second direction. In this scenario, the first direction points to the first network device, and the second direction points to the second network device. In other words, the terminal in which the communication apparatus 400 is located may communicate with the first network device in the first direction on the first band, and communicate with the second network device in the second direction on the second band.

In addition, the plurality of second antenna units are further configured to transmit the plurality of radio frequency signals of the first band, and the plurality of first antenna units are further configured to transmit the plurality of radio frequency signals of the first band, to form a third carrier signal pointing to the first direction.

In the non-inter-band CA scenario, both the first antenna unit and the second antenna unit in the antenna array 402 are configured to form the third carrier signal in the first direction. In this scenario, the terminal in which the communication apparatus 400 is located may communicate with the network device in the first direction on the first band.

In addition, the plurality of first antenna units are further configured to transmit the plurality of radio frequency signals of the second band, and the plurality of second antenna units are further configured to transmit the plurality of radio frequency signals of the second band, to form a fourth carrier signal pointing to the second direction.

In the non-inter-band CA scenario, both the first antenna unit and the second antenna unit in the antenna array 402 are configured to form the fourth carrier signal in the second direction. In this scenario, the terminal in which the communication apparatus 400 is located may communicate with the network device in the second direction on second first band.

It should be noted that, in the non-inter-band CA scenario, the first antenna unit and the second antenna unit in the antenna array 402 may be further configured to form a carrier signal in a third direction, that is, communicate with the network device 3 in the third direction on a third band.

Compared with the phased array system shown in FIG. 3A and FIG. 3B, in the communication apparatus 400, the antenna units in the antenna array 402 may be used in both the inter-band CA scenario and the non-inter-band CA scenario. In the non-inter-band CA scenario, the antenna unit in the antenna array 402 may be configured to form a carrier signal in one direction. In the inter-band CA scenario, the antenna unit in the antenna array 402 may be respectively configured to form carrier signals in two directions. In other words, through the communication apparatus 400, hardware resource consumption for implementing the inter-band CA is small, and a phenomenon of hardware resource waste to adapt to the inter-band CA scenario does not occur. In the communication apparatus 400, the inter-band CA and the non-inter-band CA may be implemented through one antenna array 402.

Figure 5:
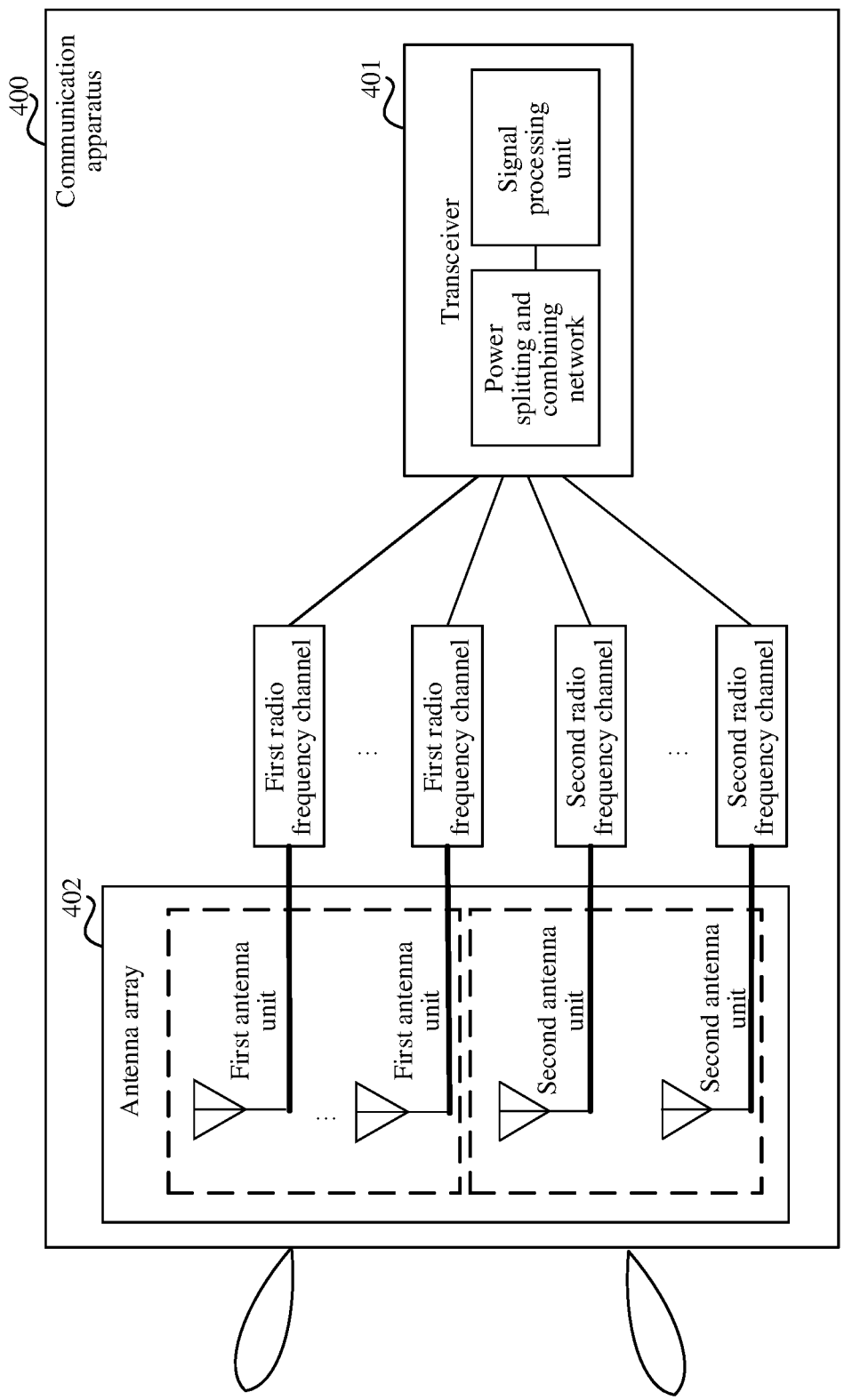
FIG. 5 is a schematic diagram of a structure of a second communication apparatus according to an embodiment of this application.

In addition, in the communication apparatus 400, the transceiver 401 includes a power splitting and combining network and a signal processing unit, as shown in FIG. 5. The power splitting and combining network is coupled to the plurality of radio frequency channels, and is configured to connect a plurality of first radio frequency channels to the signal processing unit, and connect a plurality of second radio frequency channels to the signal processing unit. The plurality of first radio frequency channels are a plurality of radio frequency channels respectively coupled to the plurality of first antenna units, and the plurality of second radio frequency channels are a plurality of radio frequency channels respectively coupled to the plurality of second antenna units.

Just as the name implies, the power splitting and combining network has two functions: power splitting and signal combining. When the communication apparatus 400 is configured to receive signals, the power splitting and combining network is configured for signal combining. When the communication apparatus 400 is configured to send signals, the power splitting and combining network is configured for power splitting.

Specifically, the signal processing unit may include a first signal processing unit and a second signal processing unit, where the first signal processing unit includes a first sent signal processing unit and a first received signal processing unit, and the second signal processing unit includes a second sent signal processing unit and a second received signal processing unit. The sent signal processing unit is configured to process, for example, perform amplification and/or up-conversion on, a signal to be sent out. The received signal processing unit is configured to process, for example, perform amplification and/or down-conversion on, a received signal.

The first signal processing unit is configured to process a signal of the first band, and the second signal processing unit is configured to process a signal of the second band. In this case, in the inter-band CA scenario, the power splitting and combining network may connect the plurality of first radio frequency channels to the first signal processing unit, and connect the plurality of second radio frequency channels to the second signal processing unit, thereby implementing management of two independent beams. In the non-inter-band CA scenario, the power splitting and combining network may connect both the plurality of first radio frequency channels and the plurality of second radio frequency channels to the first signal processing unit, or to the second signal processing unit, thereby implementing management of one beam.

Specific structures of the radio frequency channel, the power splitting and combining network, and the signal processing unit shown in FIG. 5 may be implemented in plurality of manners. Two of them are described below.

Scenario 1

In Scenario 1, the first band and the second band may be located in different but overlapping frequency ranges of bands for commercial use. For example, the first band is N258 24.25 GHz to 27.5 GHz, and the second band is N257 26.5 GHz to 29.5 GHz. Alternatively, the first band and the second band may be located in a same frequency range.

Figure 6:
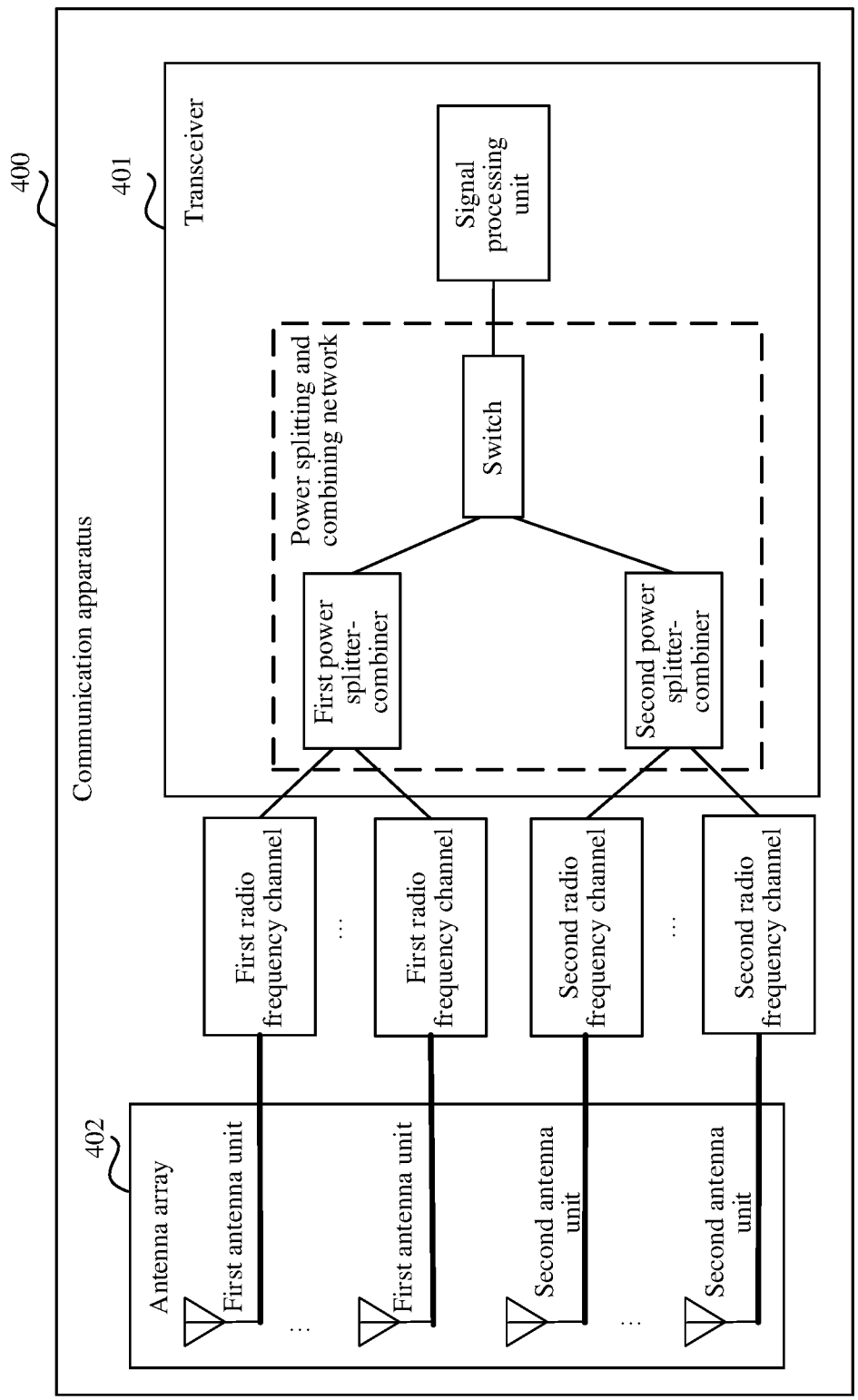
FIG. 6 is a schematic diagram of a structure of a third communication apparatus according to an embodiment of this application.

As shown in FIG. 6, a power splitting and combining network includes a first power splitter-combiner, a second power splitter-combiner, and a switch. The first power splitter-combiner is configured to implement power splitting and combining on the plurality of first radio frequency channels. The second power splitter-combiner is configured to implement power splitting and combining on the plurality of second radio frequency channels. The switch is configured to control coupling and disconnection between the first power splitter-combiner and the signal processing unit, and control coupling or disconnection between the second power splitter-combiner and the signal processing unit.

Specifically, the switch may be configured to: control connection and disconnection between the first power splitter-combiner and the first signal processing unit; control connection and disconnection between the first power splitter-combiner and the second signal processing unit; control connection and disconnection between the second power splitter-combiner and the first signal processing unit; and control connection and disconnection between the second power splitter-combiner and the second signal processing unit.

The first signal processing unit is configured to process the signal of the first band, and the second signal processing unit is configured to process the signal of the second band. Therefore, through control of the switch, both the first power splitter-combiner and the second power splitter-combiner may be coupled to the first signal processing unit, thereby implementing transmission of the signal of the first band in the non-inter-band CA scenario. Alternatively, both the first power splitter-combiner and the second power splitter-combiner may be coupled to the second signal processing unit, thereby implementing transmission of the signal of the second band in the non-inter-band CA scenario. The first power splitter-combiner may be coupled to the first signal processing unit, and the second power splitter-combiner may be coupled to the second signal processing unit, thereby implementing carrier aggregation of the first band and the second band in the inter-band CA scenario.

Figure 7:
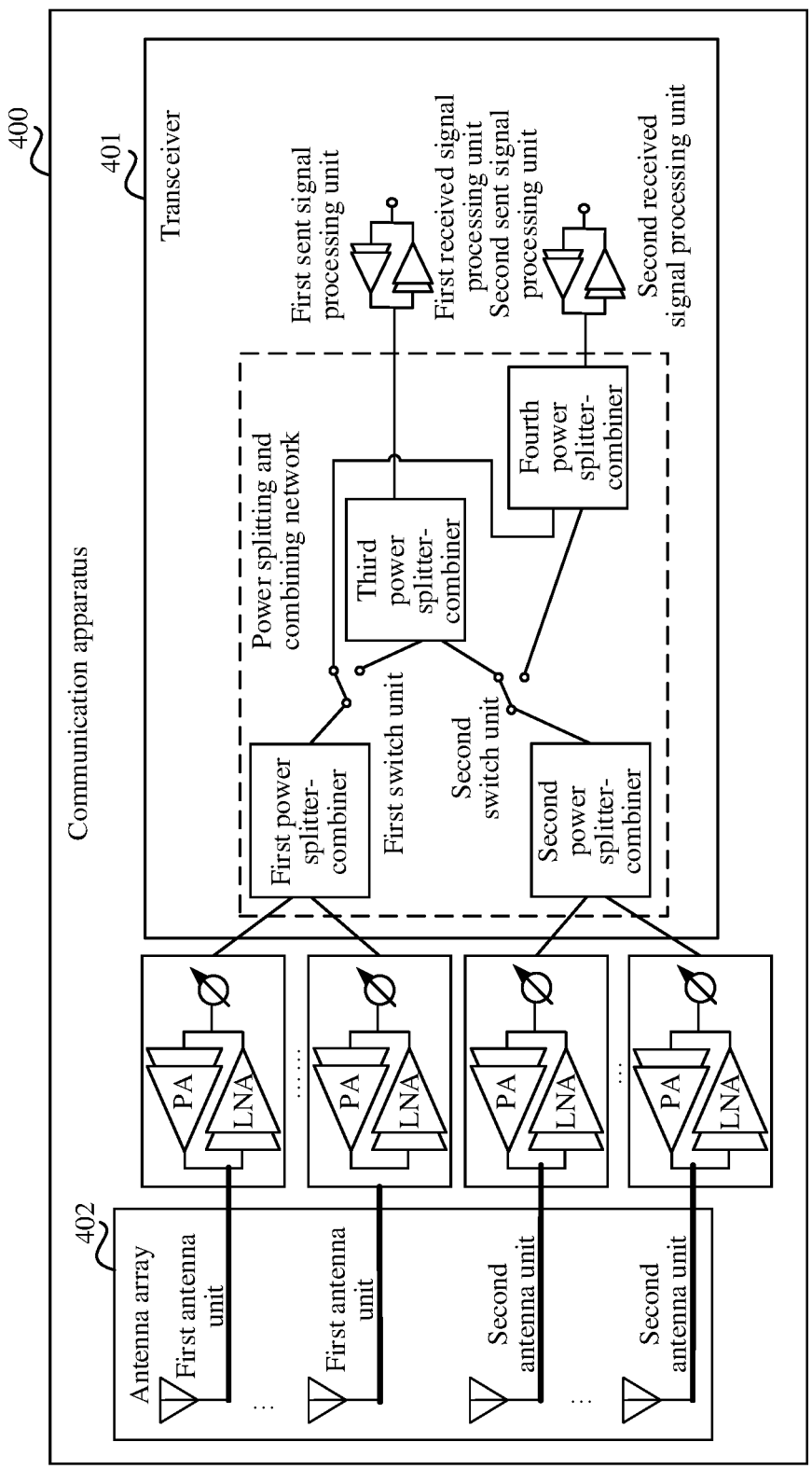
FIG. 7 is a schematic diagram of a structure of a fourth communication apparatus according to an embodiment of this application.

Further, as shown in FIG. 7, the switch may include a switch unit, a third power splitter-combiner, and a fourth power splitter-combiner. The switch unit includes a first switch unit and a second switch unit, where the first switch unit is configured to connect the first power splitter-combiner to a third power splitter-combiner or a fourth power splitter-combiner, and the second switch unit is configured to connect the second power splitter-combiner to the third power splitter-combiner or the fourth power splitter-combiner. The third power splitter-combiner is configured to connect the switch unit to the first signal processing unit. The fourth power splitter-combiner is configured to connect the switch unit to the second signal processing unit.

Through switching of the first switch unit, connection and disconnection between the first power splitter-combiner and the first signal processing unit may be controlled, and connection and disconnection between the first power splitter-combiner and the second signal processing unit may be controlled. Through switching of the second switch unit, connection and disconnection between the second power splitter-combiner and the first signal processing unit may be controlled, and connection and disconnection between the second power splitter-combiner and the second signal processing unit may be controlled.

Through switching of the switch unit in the power splitting and combining network, the power splitting and combining network may be enabled, in the inter-band CA scenario, to connect the plurality of first radio frequency channels to the first signal processing unit and connect the plurality of second radio frequency channels to the second signal processing unit, thereby implementing management of two independent beams. Through switching of the switch unit in the power splitting and combining network, the power splitting and combining network may be enabled, in the non-inter-band CA scenario, to connect both the plurality of first radio frequency channels and the plurality of second radio frequency channels to the first signal processing unit (to communicate with the network device 1 on the first band), or to the second signal processing unit (to communicate with the network device 2 on the second band), thereby implementing management of one beam.

In addition, in the communication apparatus 400 shown in FIG. 7, each radio frequency channel may include a front-end device and a phase shifter. The front-end device includes a low noise amplifier (LNA) and a power amplifier (PA) that are connected in parallel, where the LNA is configured to amplify a received signal of the antenna array 402, and the PA is configured to amplify a sent signal of the antenna array 402. The phase shifter is coupled to the front-end device, and is configured to shift the phase of the radio frequency signal transmitted in the radio frequency channel. For example, in the inter-band CA scenario, the phase shifter in the first radio frequency channel is respectively configured to set phases of the plurality of radio frequency signals of the first band transmitted in the plurality of first radio frequency channels, to form a first carrier signal. The phase shifter in the second radio frequency channel is respectively configured to set phases of the plurality of radio frequency signals of the second band transmitted in the plurality of second radio frequency channels, to form a second carrier signal.

It should be noted that, in the radio frequency channel, a connection sequence of the front-end device and the phase shifter may be exchanged. For example, connection of the front-end device and the phase shifter may be that the phase shifter is coupled to the antenna unit, and the front-end device is coupled the power splitting and combining network. The connection sequence of the front-end device and the phase shifter is not specifically limited in this embodiment of this application.

Optionally, as shown in FIG. 7, the first sent signal processing unit may further include a first transmit amplifier, and the first received signal processing unit includes a first receive amplifier. The second sent signal processing unit includes a second transmit amplifier, and the second received signal processing unit includes a second receive amplifier.

The first transmit amplifier and the first receive amplifier may be bidirectionally connected in parallel. The second transmit amplifier and the second receive amplifier may be bidirectionally connected in parallel.

The transmit amplifier in the signal processing unit is configured to amplify and drive a transmitted radio frequency signal. The receive amplifier in the signal processing unit is configured to amplify and drive a received radio frequency signal.

In the communication apparatus 400 shown in FIG. 7, the first band and the second band may be located in a same frequency range. Therefore, for each radio frequency channel, the front-end device in the radio frequency channel may be configured to send/receive a signal of the first band, and may be configured to send/receive a signal of the second band. That is, the front-end device in the radio frequency channel may be universal for transmission of the radio frequency signals of the first band and the second band.

In addition, the first sent signal processing unit may further include a first up-converter connected in series to the first transmit amplifier. The first received signal processing unit may further include a first down-converter connected in series to the first receive amplifier. The second sent signal processing unit may further include a second up-converter connected in series to the second transmit amplifier. The second received signal processing unit may further include a second down-converter connected in series to the second receive amplifier.

The up-converter in the sent signal processing unit is configured to perform up-conversion on an intermediate frequency/low frequency signal, to obtain a radio frequency signal. The down-converter in the received signal processing unit is configured to perform down-conversion on a radio frequency signal, to obtain an intermediate frequency/low frequency signal.

In actual application, the up-converter may include a mixer, a phase locked loop (PLL), and the like, and the down-converter may also include a mixer, a PLL, and the like.

It should be understood that if the signal processing unit does not include the up-converter and the down-converter, the communication apparatus 400 provides a radio frequency interface externally. If the signal processing unit includes the up-converter and the down-converter, the communication apparatus 400 provides an intermediate frequency/low frequency interface externally.

In Scenario 1, alternatively, the power splitting and combining network in the communication apparatus 400 may be implemented in another manner.

Figure 8:
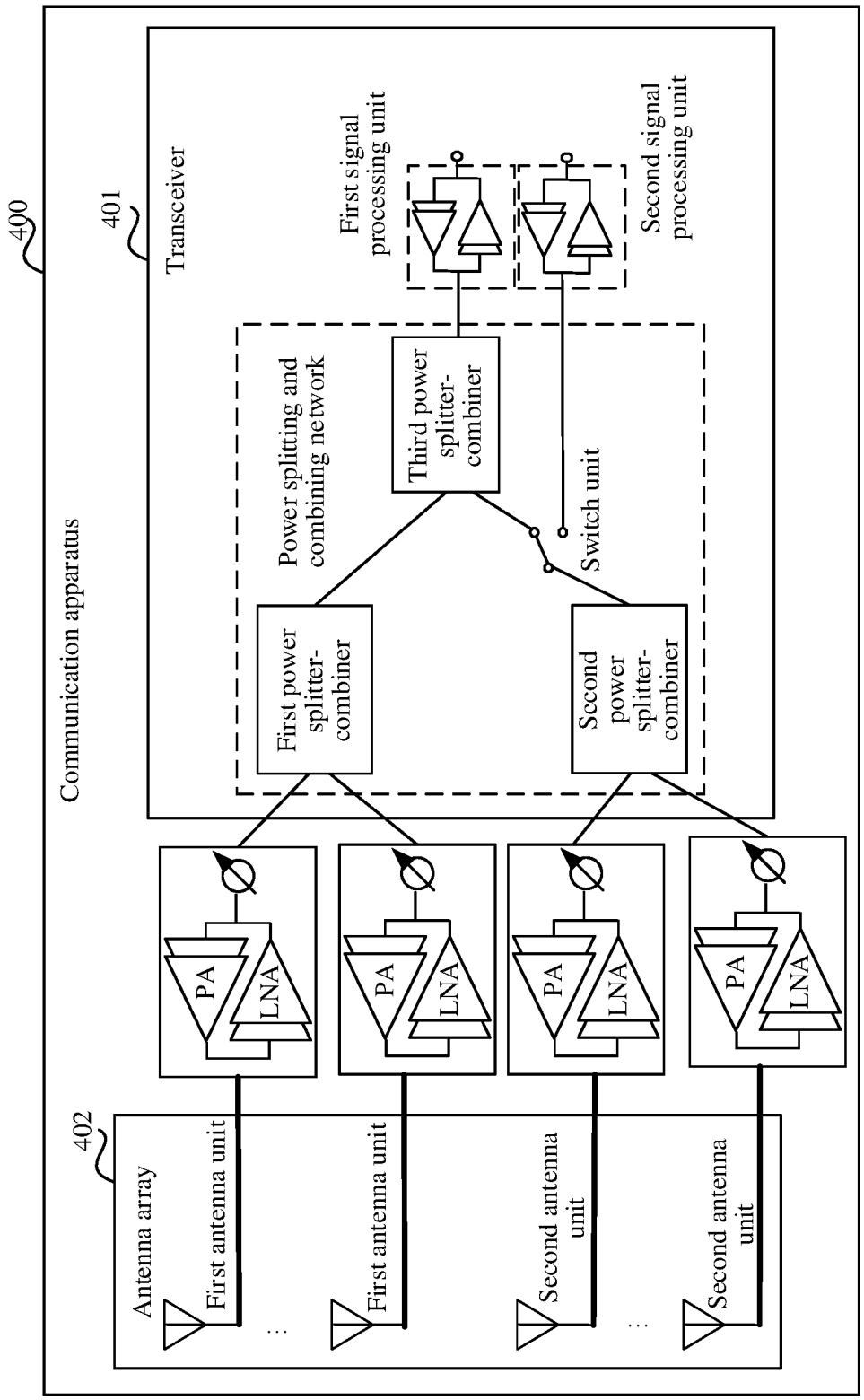
FIG. 8 is a schematic diagram of a structure of a fifth communication apparatus according to an embodiment of this application.

As shown in FIG. 8, in the communication apparatus 400, a power splitting and combining network includes a first power splitter-combiner, a second power splitter-combiner, a third power splitter-combiner, and a switch unit.

The first power splitter-combiner is coupled to the third power splitter-combiner, and the switch unit is configured to couple the second power splitter-combiner to the third power splitter-combiner or the second signal processing unit.

Through the communication apparatus 400 shown in FIG. 8, in the inter-band CA scenario, the switch unit couples the second power splitter-combiner to the second signal processing unit. The first signal processing unit is configured to process the signal of the first band, and the second signal processing unit is configured to process the signal of the second band, thereby implementing management of two independent beams. In the non-inter-band CA scenario, the switch unit couples the second power splitter-combiner to the third power splitter-combiner, and the first signal processing unit is configured to process the signal of the first band or the signal of the second band, thereby implementing management of one beam.

The following describes a specific example of the communication apparatus 400 in Scenario 1.

Figure 9:
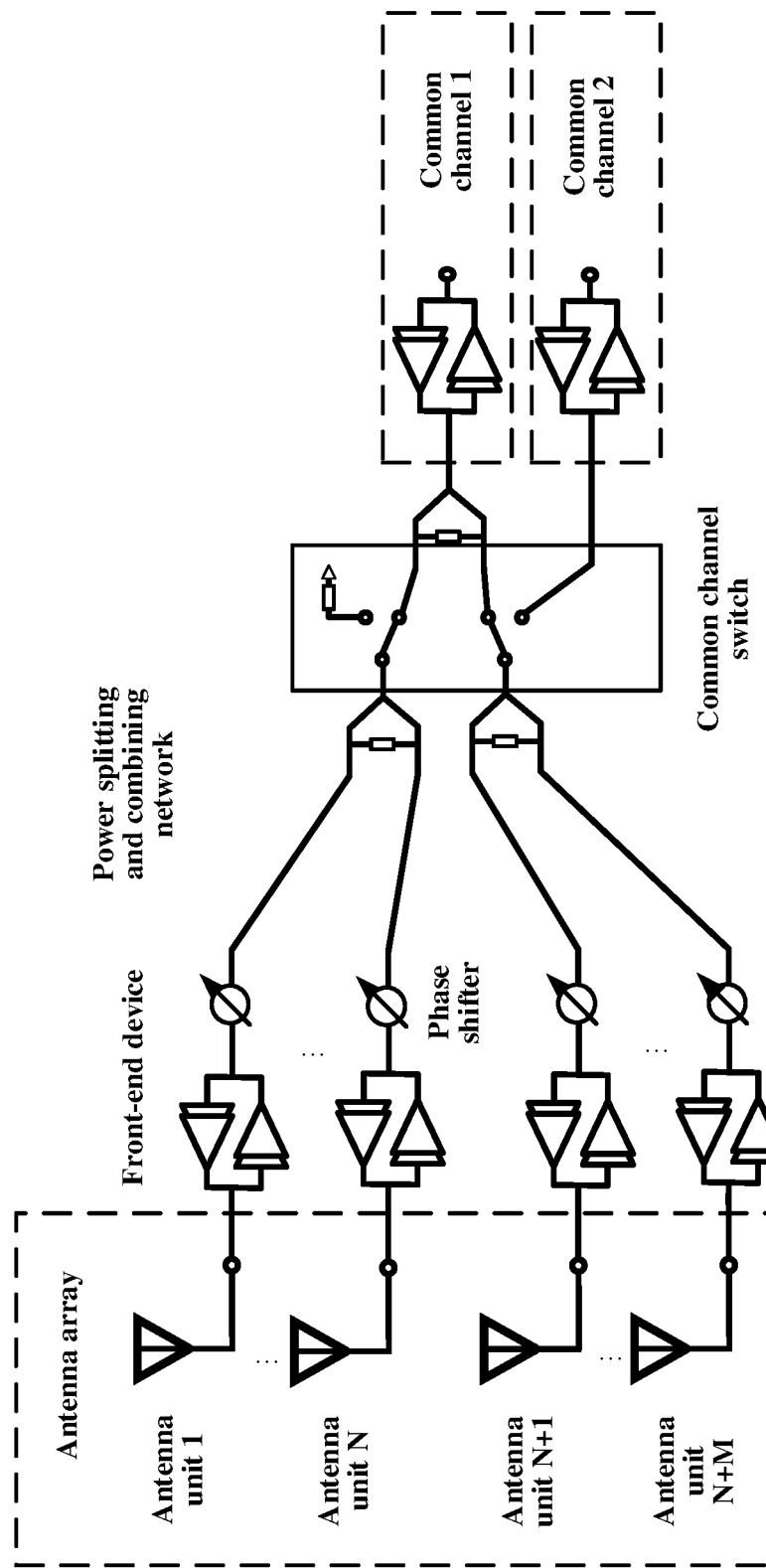
FIG. 9 is a schematic diagram of a structure of a sixth communication apparatus according to an embodiment of this application.

The communication apparatus shown in FIG. 9 may be considered as a specific example of the communication apparatus 400. The architecture has the following characteristics. The antenna array is divided into two groups. The first group includes an antenna unit 1 to an antenna unit N, and the second group includes an antenna unit N+1 to an antenna unit N+M. Each of the two groups of antennas has a corresponding radio frequency channel resource. In addition to the power splitting and combining network and a common channel 1, the architecture further includes a common channel switch and a common channel 2. The antenna unit N to the antenna unit N+M and the corresponding radio frequency channel resources may point to the common channel 2 through switching of the common channel switch. The common channel 1 may be considered as a specific example of the first signal processing unit. The common channel 2 may be considered as a specific example of the second signal processing unit.

Figure 10A:
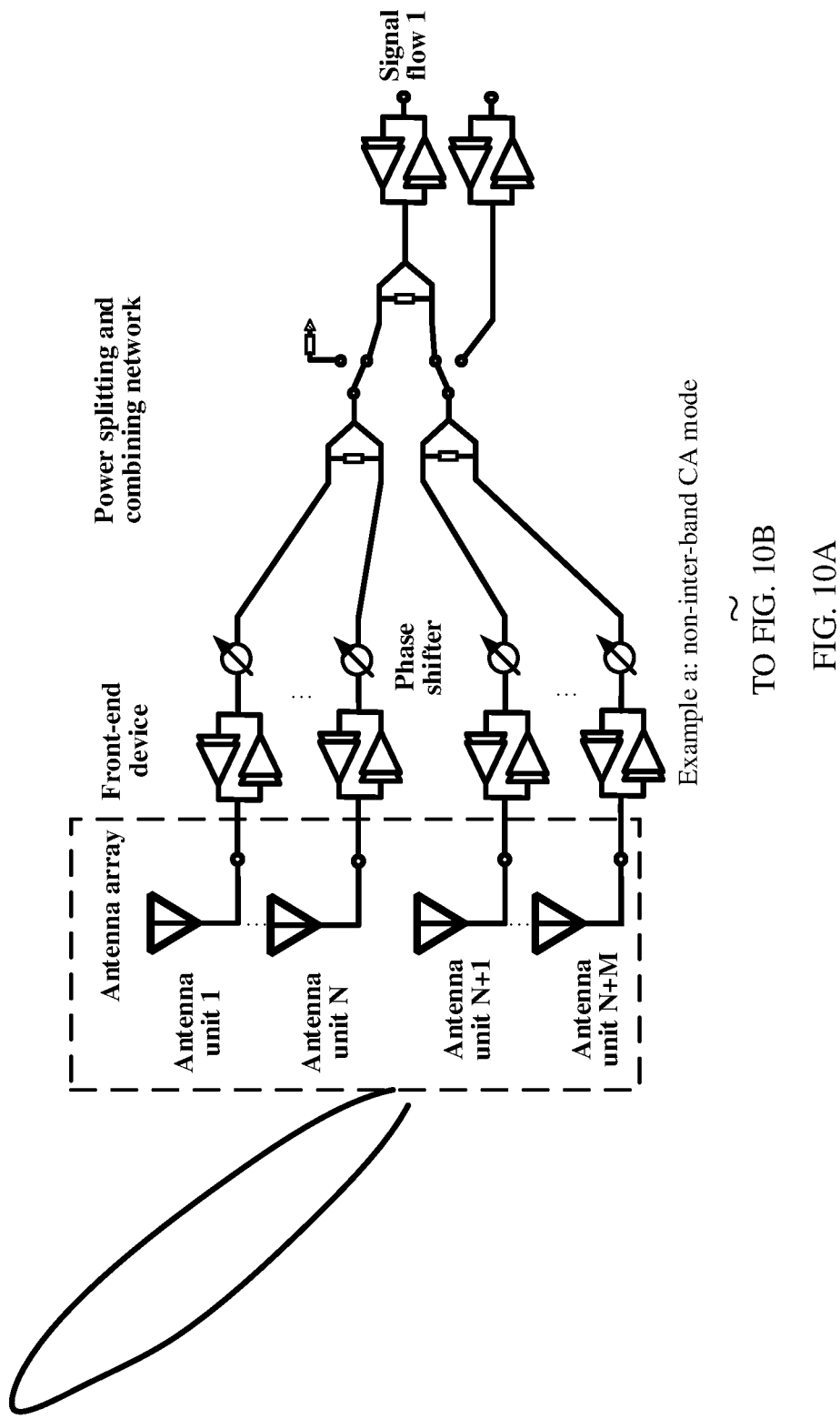
FIG. 10A and FIG. 10B are schematic diagrams of a structure of a seventh communication apparatus according to an embodiment of this application.
Figure 10B:
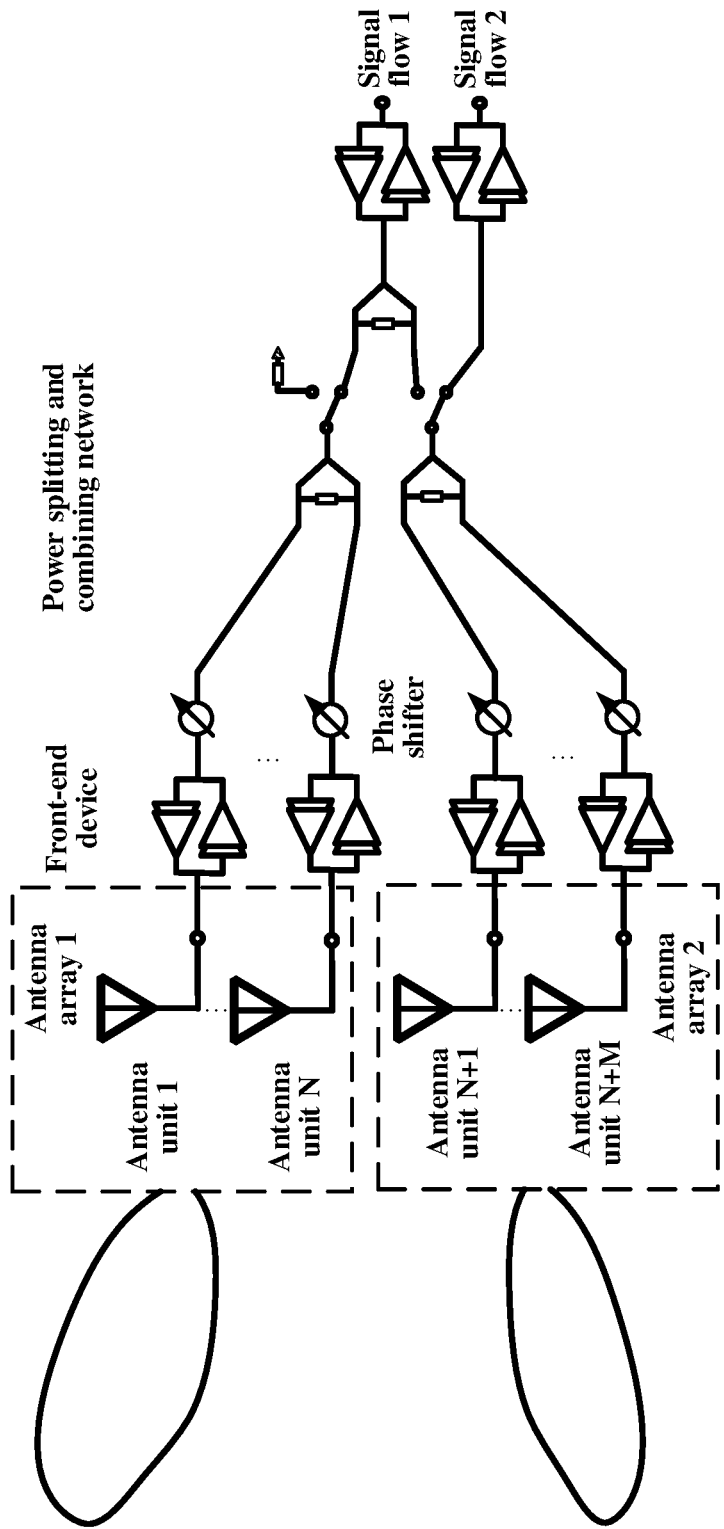

In the non-inter-band CA scenario and the inter-band CA scenario, the operating statuses of the antenna unit and the common channel is switched. In a non-inter-band CA mode, the common channel switch points to the common channel 1. The antenna unit 1 to the antenna unit N, the antenna unit N+1 to the antenna unit N+M, and the corresponding radio frequency channel resources all transmit a signal flow 1, as shown in an example a in FIG. 10A. In an inter-band CA mode, the common channel switch points to the common channel 2. The antenna unit 1 to the antenna unit N and the corresponding radio frequency channel resources transmit the signal flow 1, and the antenna unit N+1 to the antenna unit N+M and the corresponding radio frequency channel resources transmit a signal flow 2, as shown in example b in FIG. 10B.

Scenario 2 in Scenario 2, the first band and the second band may be located in frequency ranges that are different and that are not overlapping. For example, the first band may be n259 39.5 GHz to 43.5 GHz, and the second band may be n261 27.5 GHz to 28.35 GHz or 57 GHz to 71 GHz.

Figure 11A:
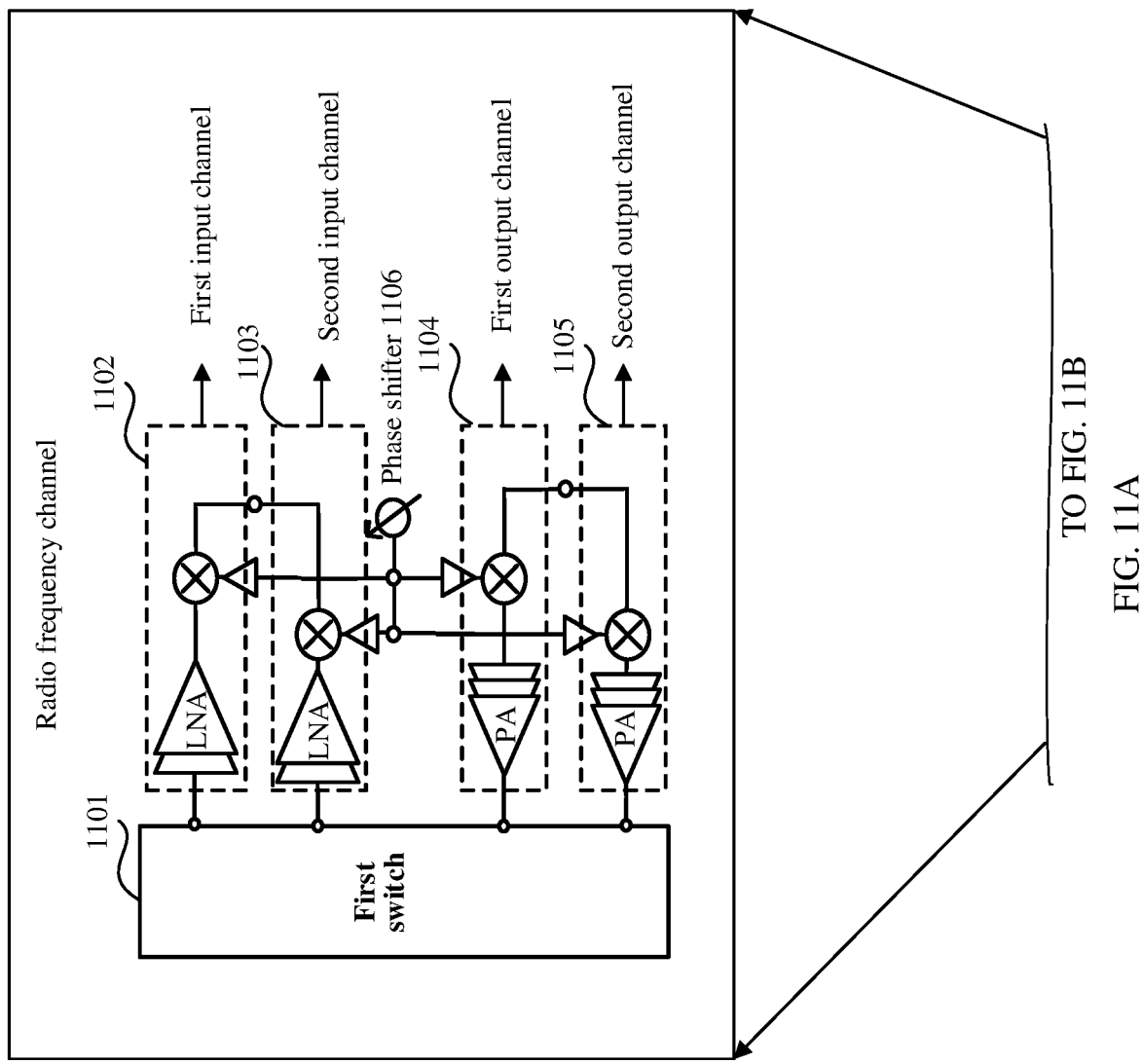
FIG. 11A and FIG. 11B are schematic diagrams of a structure of an eighth communication apparatus according to an embodiment of this application.

Specifically, as shown in FIG. 11A, each of the plurality of radio frequency channels includes a first switch 1101, a first input channel 1102, a second input channel 1103, a first output channel 1104, a second output channel 1105, and a phase shifter 11o6. The first switch 1101 is configured to switch on the first input channel 1102 or the second input channel 1103, and switch on the first output channel 1104 or the second output channel 1105. The first input channel 1102 includes a first LNA and a first mixer that are connected in series. The second input channel 1103 includes a second LNA and a second mixer that are connected in series. The first output channel 1104 includes a first PA and a third mixer that are connected in series. The second output channel 1105 includes a second PA and a fourth mixer that are connected in series. The phase shifter 11o6 is coupled to an input end of each mixer in the radio frequency channel.

The first LNA and the first mixer are configured to receive and process a radio frequency signal of the first band. The second LNA and the second mixer are configured to receive and process a radio frequency signal of the second band. The first PA and the third mixer are configured to process and send the radio frequency signal of the first band. The second PA and the fourth mixer are configured to process and send the radio frequency signal of the second band.

In Scenario 2, the first band and the second band are located in different millimeter wave frequency ranges. Therefore, a frequency difference between the first band and the second band is relatively large. It is difficult to share a group of front-end devices when the radio frequency signal of the first band and the radio frequency signal of the second band are transmitted. Preferably, in Scenario 2, there are but not limited to two input channels and two output channels. For example, among the two input channels, one input channel is for transmitting the signal of the first band, the other input channel is for transmitting the signal of the second band, and the two input channels are switched through the first switch. Among the two output channels, one output channel is for transmitting the signal of the first band, the other output channel is for transmitting the signal of the second band, and the two input channels are switched through the first switch.

Figure 11B:
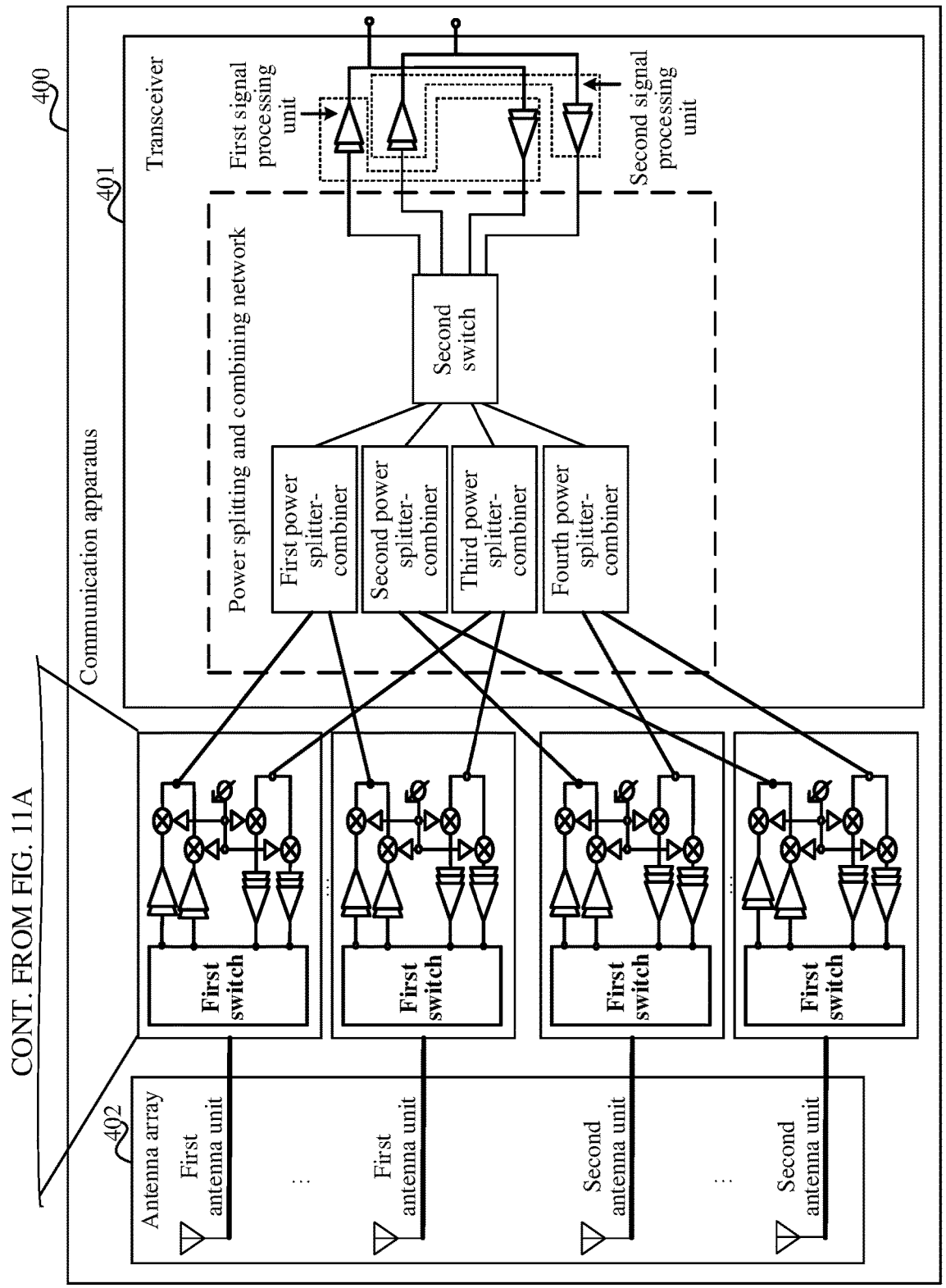

In addition, as shown in FIG. 11B, the power splitting and combining network may include: a first power splitter-combiner, configured to implement power splitting and combining on each input channel of the plurality of first radio frequency channels coupled with the plurality of first antenna units; a second power splitter-combiner, configured to implement power splitting and combining on each input channel of the plurality of second radio frequency channels coupled with the plurality of second antenna units; a third power splitter-combiner, configured to implement power splitting and combining on each output channel of the plurality of first radio frequency channels coupled with the plurality of first antenna units; a fourth power splitter-combiner, configured to implement power splitting and combining on each output channel of the plurality of second radio frequency channels coupled with the plurality of second antenna units; and a second switch, configured to control connection between the first power splitter-combiner and the first received signal processing unit, control connection between the third power splitter-combiner and the first sent signal processing unit, control connection between the second power splitter-combiner and the first received signal processing unit or the second received signal processing unit, and control connection between the fourth power splitter-combiner and the first sent signal processing unit or the second sent signal processing unit.

That is, through the second switch, the first power splitting and combining network may be coupled to the first received signal processing unit, and the third power splitter-combiner may be coupled to the first sent signal processing unit. Moreover, the second power splitter-combiner may be coupled to the first received signal processing unit or the second received signal processing unit, and the fourth power splitter-combiner may be coupled to the first sent signal processing unit or the second sent signal processing unit.

In the inter-band CA scenario, the second switch may couple the second power splitter-combiner to the second received signal processing unit, and couple the fourth power splitter-combiner to the second sent signal processing unit. In this case, the first sent signal processing unit and the first received signal processing unit may be configured to process a signal of the first band transmitted by the first antenna unit, and the second sent signal processing unit and the second received signal processing unit may be configured to process a signal of the second band transmitted by the second antenna unit, thereby implementing management of two independent beams.

In the non-inter-band CA scenario, the second switch may couple the second power splitter-combiner to the first received signal processing unit, and couple the fourth power splitter-combiner to the first sent signal processing unit. In this case, the first sent signal processing unit and the first received signal processing unit may be configured to process a signal of the first band or a signal of the second band transmitted by the antenna array 402, thereby implementing management of one beam.

Figure 12:
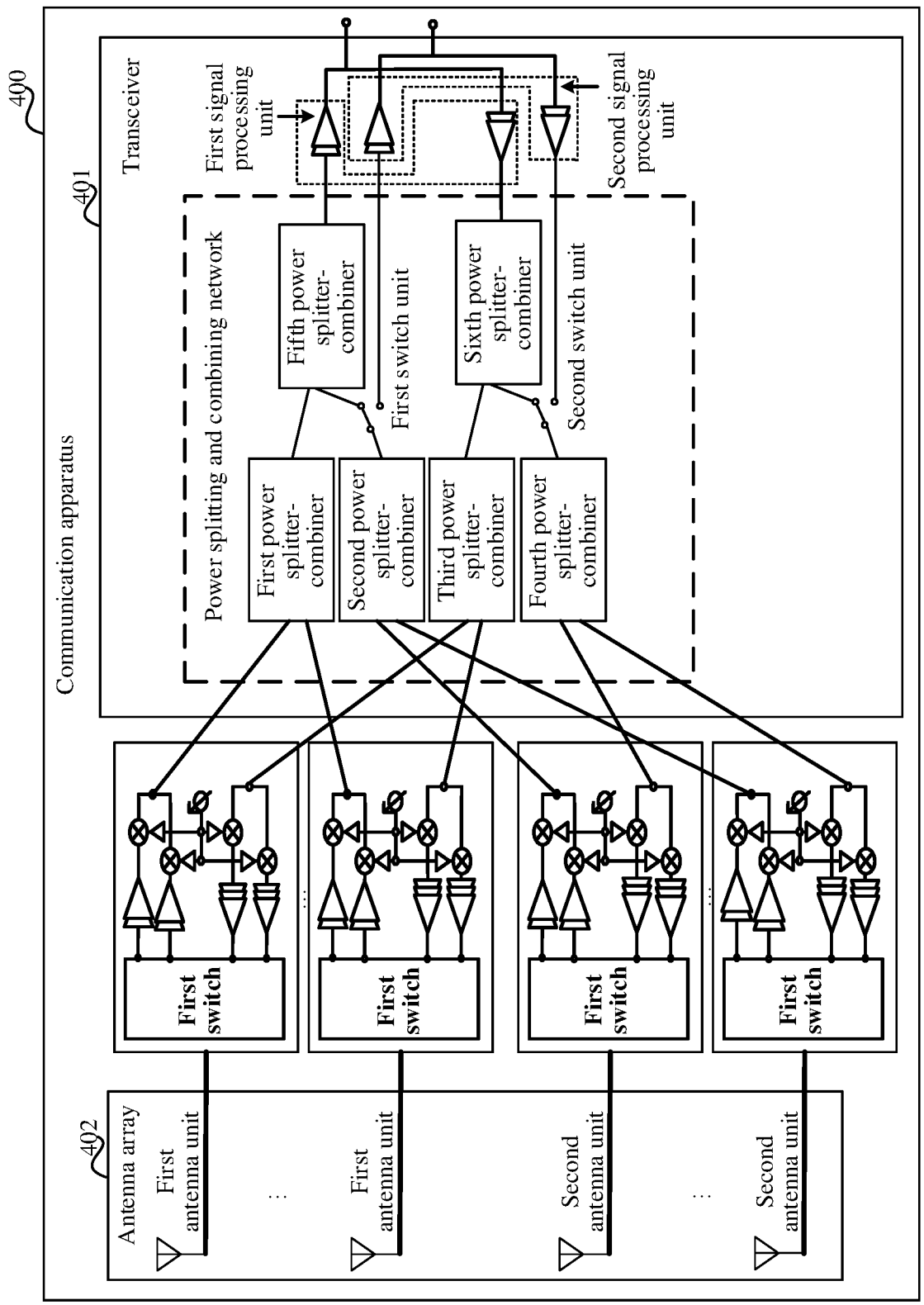
FIG. 12 is a schematic diagram of a structure of a ninth communication apparatus according to an embodiment of this application.

Specifically, as shown in FIG. 12, the second switch may include a first switch unit, a second switch unit, a fifth power splitter-combiner, and a sixth power splitter-combiner.

The first switch unit may be coupled to the second power splitter-combiner, the fifth power splitter-combiner, and the second received signal processing unit, and is configured to connect the second power splitter-combiner to the fifth power splitter-combiner, or connect the second power splitter-combiner to the second received signal processing unit. The second switch unit may be coupled to the fourth power splitter-combiner, the sixth power splitter-combiner, and the second sent signal processing unit, and is configured to connect the fourth power splitter-combiner to the sixth power splitter-combiner, or connect the fourth power splitter-combiner to the second sent signal processing unit. The fifth power splitter-combiner may be coupled to the first power splitter-combiner, the first switch unit, and the first received signal processing unit, and is configured to connect the first power splitter-combiner and the second power splitter-combiner to the first received signal processing unit, or connect the first power splitter-combiner to the first received signal processing unit. The sixth power splitter-combiner may be coupled to the third power splitter-combiner, the second switch unit, and the first sent signal processing unit, and is configured to connect the third power splitter-combiner and the fourth power splitter-combiner to the first sent signal processing unit, or connect the third power splitter-combiner to the first sent signal processing unit.

Further, as shown in FIG. 11B and FIG. 12, the first received signal processing unit may further include a first amplifier, and the first sent signal processing unit may include a second amplifier. The second received signal processing unit may include a third amplifier, and the second sent signal processing unit may include a fourth amplifier.

An input end of the first amplifier may be coupled to the fifth power splitter-combiner, an output end of the second amplifier may be coupled to the sixth power splitter-combiner, and an output end of the first amplifier is coupled to an input end of the second amplifier. An input end of the third amplifier may be coupled to the fifth power splitter-combiner, an output end of the fourth amplifier may be coupled to the sixth power splitter-combiner, and an output end of the third amplifier may be coupled to an input end of the fourth amplifier.

The amplifier in the signal processing unit may be configured to amplify and drive a transmitted radio frequency signal.

It should be noted that, in FIG. 11B and FIG. 12, an amplifier is not shown for ease of identification. It should be understood that, in the first signal processing unit, an amplifier in the receiving direction is a first amplifier, and an amplifier in the sending direction is a second amplifier. In the second signal processing unit, an amplifier in the receiving direction is a third amplifier, and an amplifier in the sending direction is a fourth amplifier.

In addition, in another possible design, the first received signal processing unit may further include a first down-converter, and the second received signal processing unit may further include a second down-converter. The first sent signal processing unit may further include a first up-converter, and the second sent signal processing unit may further include a second up-converter.

It should be understood that if the signal processing unit does not include the up-converter and the down-converter, the communication apparatus 400 provides a radio frequency interface externally. If the signal processing unit includes the up-converter and the down-converter, the communication apparatus 400 provides an intermediate frequency/low frequency interface externally.

In the communication apparatus 400 shown in FIG. 11B and FIG. 12, the first band and the second band are located in different millimeter wave frequency ranges. Therefore, the front-end device in the radio frequency channel is not shared by all radio frequency channels. Signals of the first band and the second band need to be transmitted through different transmission channels. An input channel is used as an example. The first input channel may be configured to input a radio frequency signal of the first band, and the second input channel may be configured to input a radio frequency signal of the second band. That is, when the radio frequency channel receives the radio frequency signal of the first band through the antenna unit, the first switch switches on the first input channel. When the radio frequency channel receives the radio frequency signal of the second band through the antenna unit, the first switch switches on the second input channel. An output channel is switched on following a similar rule, and details are not described herein again.

In addition, if the first band and the second band are located in different but overlapping frequency ranges, the communication apparatus 400 may alternatively use the architecture shown in FIG. 11B or FIG. 12. This is not specifically limited in this embodiment of this application.

The following describes a specific example of the communication apparatus 400 in Scenario 1.

Figure 13A:
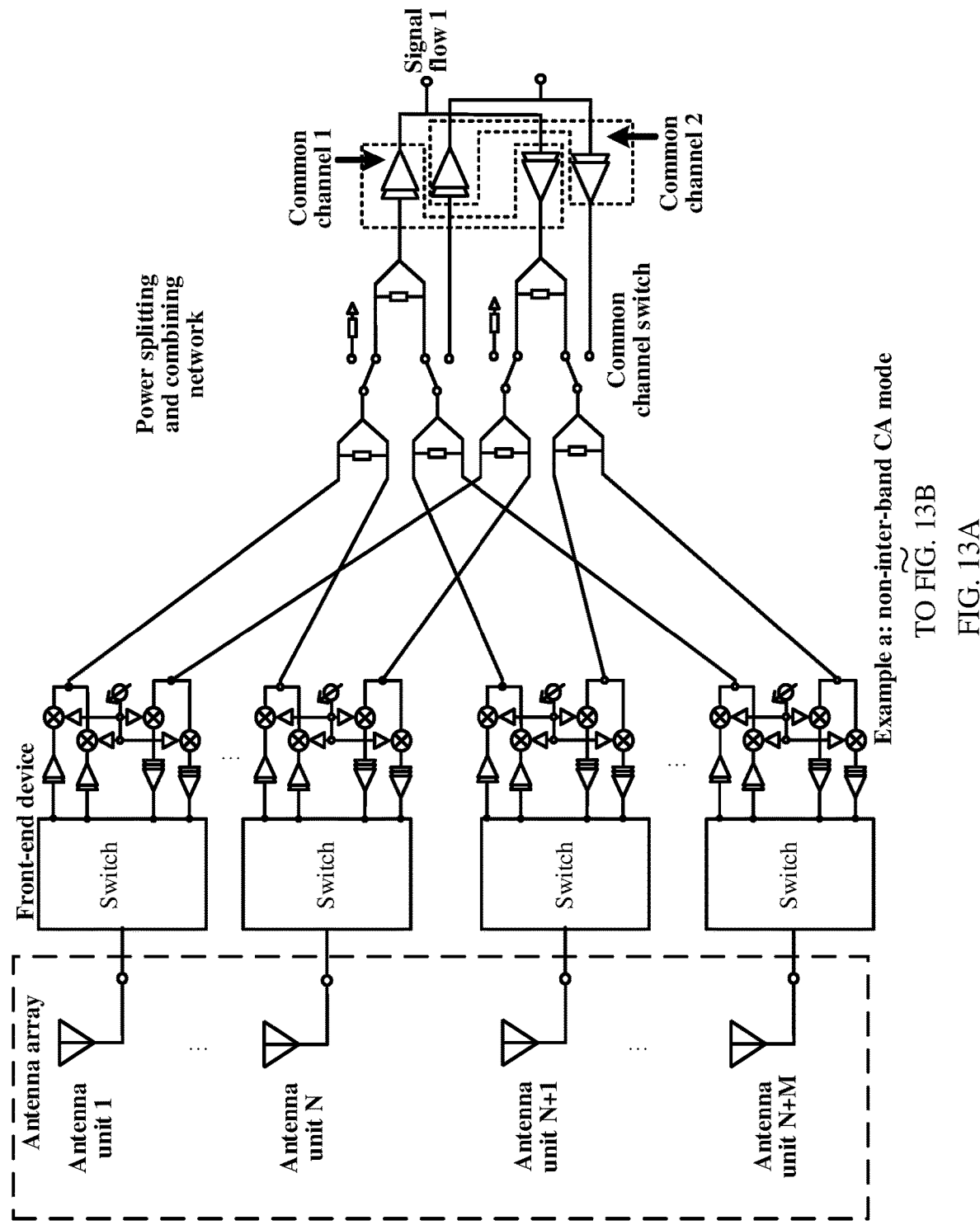
FIG. 13A and FIG. 13B are schematic diagrams of a structure of a tenth communication apparatus according to an embodiment of this application.
Figure 13B:
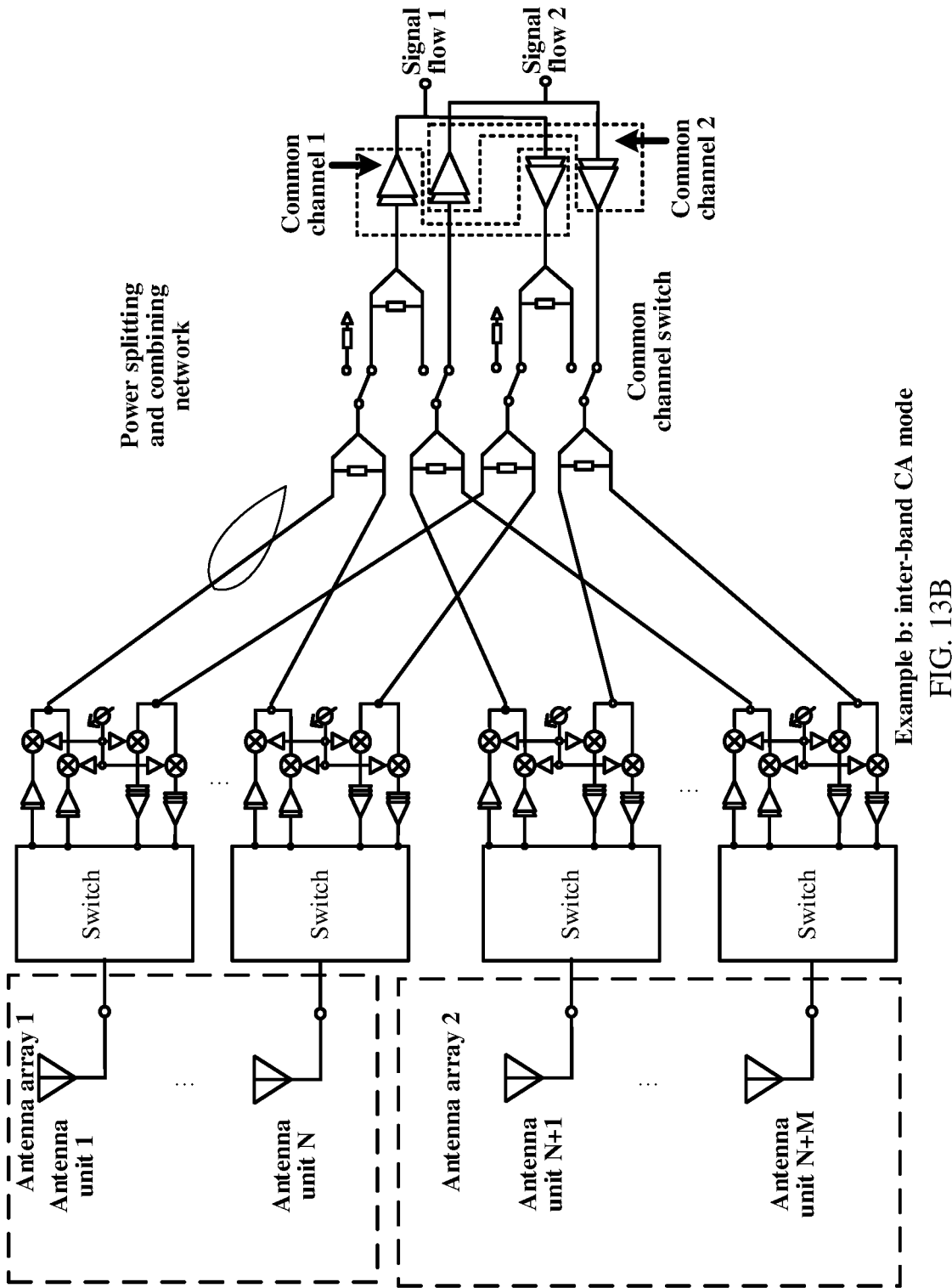

The communication apparatus shown in FIG. 13A and FIG. 13B may be considered as a specific example of the communication apparatus 400. An example a in FIG. 13A corresponds to a state of the architecture in the non-inter-band CA scenario, and an example b in FIG. 13B corresponds to a state of the architecture in the inter-band CA scenario. The architecture has the following characteristics.

In the communication apparatus shown in FIG. 13A and FIG. 13B, the front-end device is a radio frequency front-end that is phase shifted based on a local oscillator (LO), and is extended to a dual-band front-end that supports an HF band 1 and an HF band 2.

In the architecture, the antenna array is divided into two groups. The first group includes an antenna unit 1 to an antenna unit N, and the second group includes an antenna unit N+1 to an antenna unit N+M. Each of the two groups of antennas has a corresponding radio frequency channel resource. In addition to the power splitting and combining network and a common channel 1, the architecture further includes a common channel switch and a common channel 2. The antenna unit N to the antenna unit N+M and the corresponding radio frequency channel resources may point to the common channel 2 through switching of the common channel switch. The common channel 1 may be considered as a specific example of the first signal processing unit. The common channel 2 may be considered as a specific example of the second signal processing unit.

In the non-inter-band CA scenario and the inter-band CA scenario, the operating statuses of the antenna unit and the common channel is switched. In a non-inter-band CA mode, the common channel switch points to the common channel 1. The antenna unit 1 to the antenna unit N, the antenna unit N+1 to the antenna unit N+M, and the corresponding radio frequency channel resources all transmit a signal flow 1, as shown in an example a in FIG. 13A. In an inter-band CA mode, the common channel switch points to the common channel 2. The antenna unit 1 to the antenna unit N and the corresponding radio frequency channel resources transmit the signal flow 1, and the antenna unit N+1 to the antenna unit N+M and the corresponding radio frequency channel resources transmit a signal flow 2, as shown in example b in FIG. 13B.

In specific application, the HF band 1 may cover a relatively low frequency band_L1, band_L2 . . . in a high-frequency millimeter wave band, and the HF band 2 may cover a relatively high frequency band_H1, band_H2 . . . in the high-frequency millimeter wave band. Through the architecture shown in FIG. 10A and FIG. 10B, inter-band CA on low-frequency millimeter wave bands, for example, carrier aggregation on the band_L1 and the band_L2, may be implemented. Inter-band CA on high-frequency millimeter wave bands, for example, carrier aggregation on the band_H1 and the band_H2, may be implemented. Inter-band CA on a low-frequency millimeter wave band and a high-frequency millimeter wave band, for example, carrier aggregation on the band_L1 and the band_H1, may also be implemented.

In addition, in this embodiment of this application, the antenna array 402 may further include a third antenna unit, where the third antenna unit is configured to isolate the plurality of first antenna units from the plurality of second antenna units.

Figure 14:
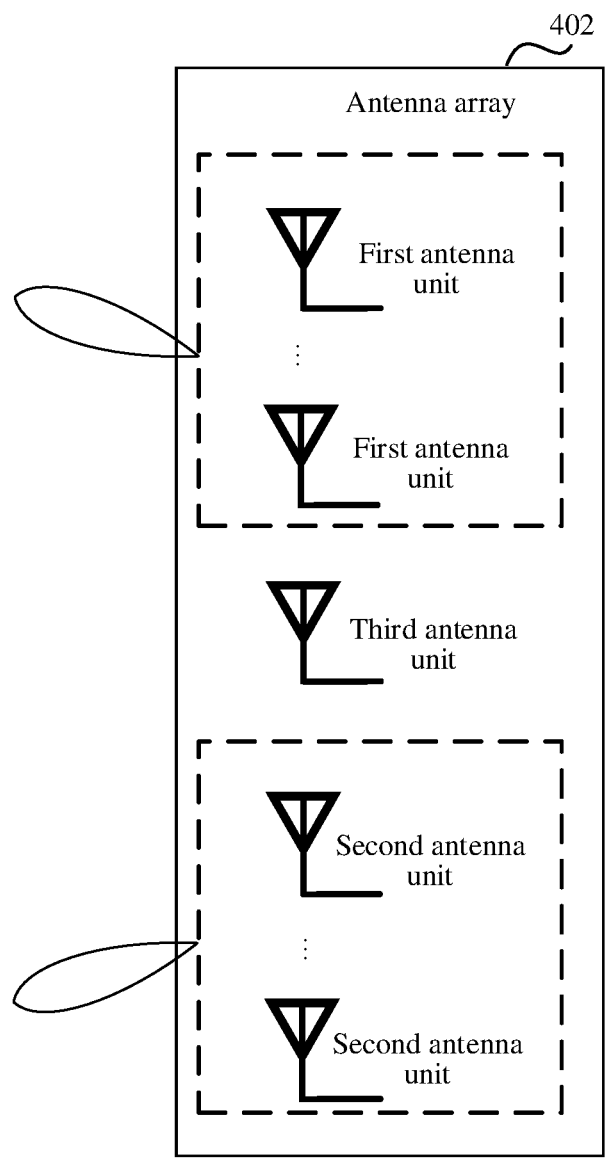
FIG. 14 is a schematic arrangement diagram of an antenna array according to an embodiment of this application.

For example, an arrangement of antenna units in the antenna array 402 may be shown in FIG. 14. The third antenna unit is arranged between the plurality of first antenna units and the plurality of second antenna units. In this case, in the inter-band CA scenario, the plurality of first antenna units transmit signals of the first band, and the plurality of second antenna units transmit signals of the second band. The third antenna unit may isolate the signals of the first band from the signals of the second band, thereby reducing interference between signals and increasing signal transmission power.

In addition, when the antenna units are arranged as above, in the non-inter-band CA scenario, some antenna units in the antenna array 402 may be selected to form an array to operate, so as to form the foregoing third carrier signal or the foregoing fourth carrier signal.

Figure 15A:
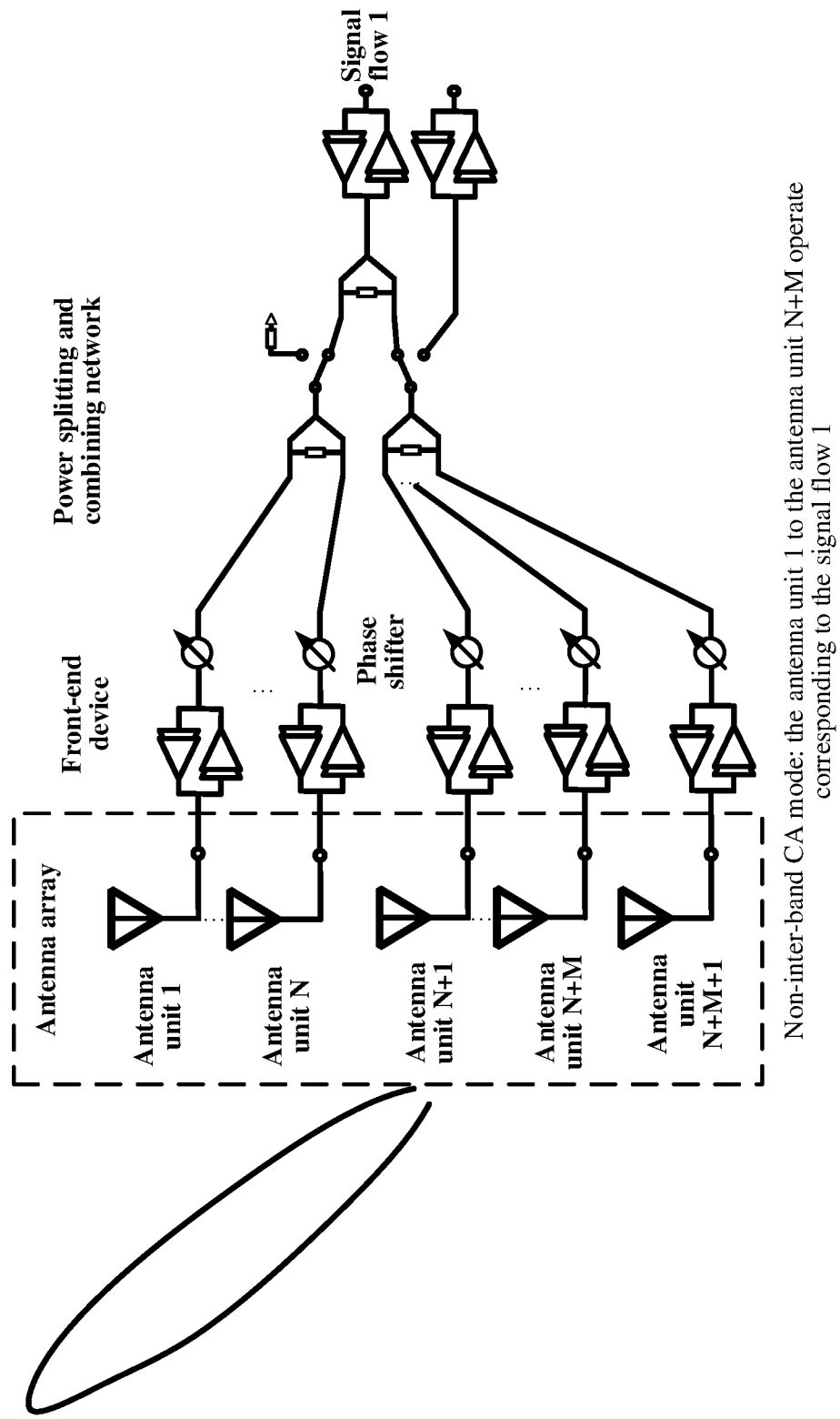
FIG. 15A and FIG. 15B are schematic diagrams of a structure of an eleventh communication apparatus according to an embodiment of this application.
Figure 15B:
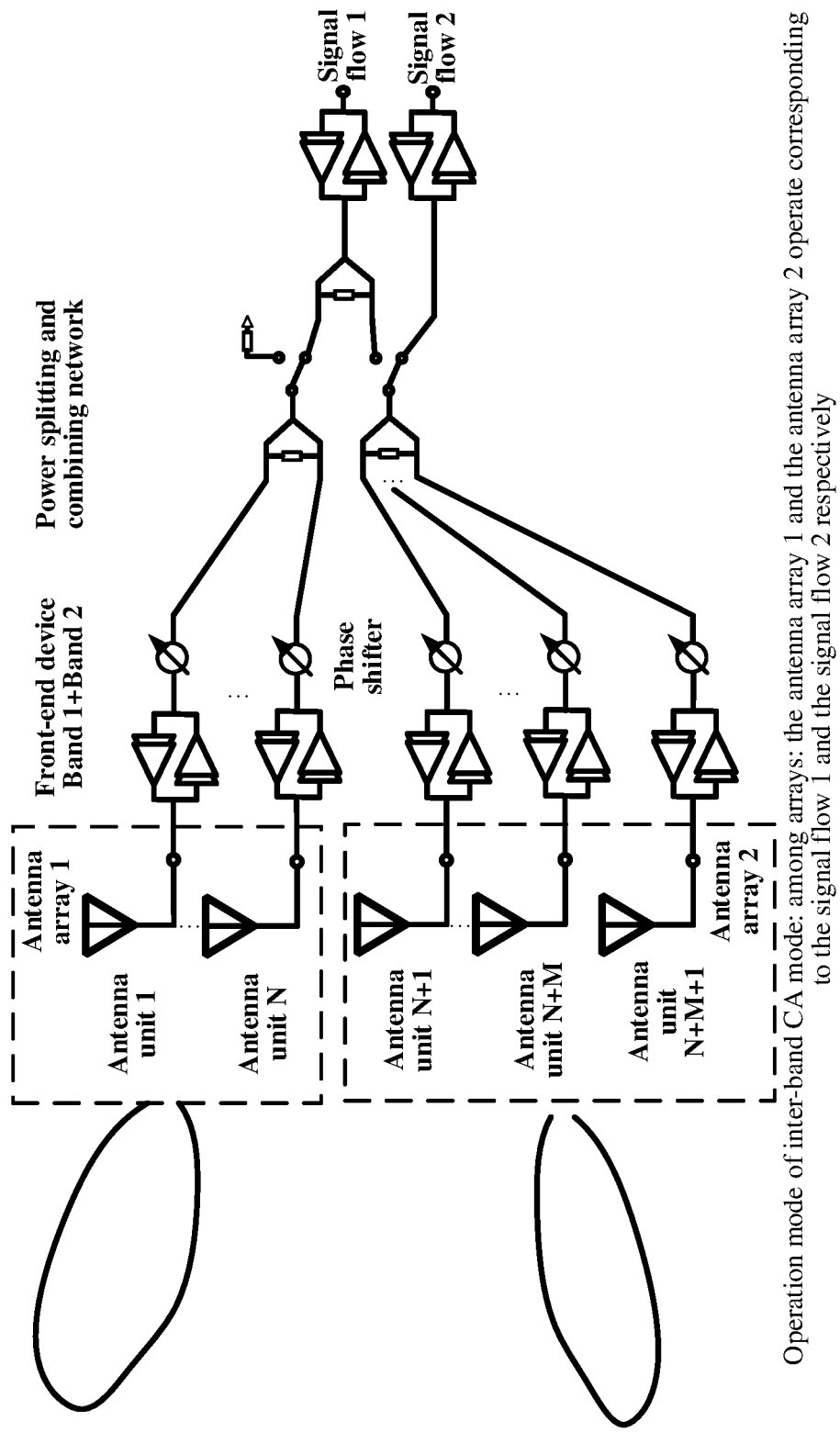

For example, FIG. 15A and FIG. 15B show a possible structure of the communication apparatus 400 when the foregoing antenna arrangement is used. FIG. 15A and FIG. 15B show N+M+1 antenna units. In the non-inter-band CA scenario, the antenna unit 1 to the antenna unit N+M form an array to operate, and the antenna unit N+M+1 does not operate. In the inter-band CA scenario, the antenna unit 1 to the antenna unit N form an array to operate to transmit a signal flow 1, the antenna unit N+2 to the antenna unit N+M+1 form an array to operate to transmit a signal flow 2. The antenna unit N+1 does not operate, and the antenna unit N+1 may be considered as the third antenna unit. Spatial isolation through the antenna unit N+1 is physically added. Therefore, in the inter-band CA scenario, isolation between signals is further improved.

In conclusion, according to the communication apparatus 400 provided in embodiments of this application, the antenna units in the antenna array 402 are divided into two parts, that is, the plurality of first antenna units and the plurality of second antenna units. In the inter-band CA scenario, the plurality of first radio frequency signals transmitted by the plurality of first antenna units are for carrier aggregation, to form a first carrier signal. The plurality of second radio frequency signals transmitted by the plurality of second antenna units are for carrier aggregation, to form a second carrier signal. Compared with the phased array system shown in FIG. 3A and FIG. 3B, in the communication apparatus 400, the antenna units in the antenna array 402 may be used in both the inter-band CA scenario and the non-inter-band CA scenario. In other words, hardware resource consumption of implementing inter-band CA through the communication apparatus 400 is low. In the non-inter-band CA scenario, all antenna units in the antenna array 402 operate. Therefore, a phenomenon that hardware resources are wasted to adapt to the inter-band CA scenario does not occur. In the communication apparatus 400, the inter-band CA and the non-inter-band CA may be implemented through one antenna array 402.

Figure 16:
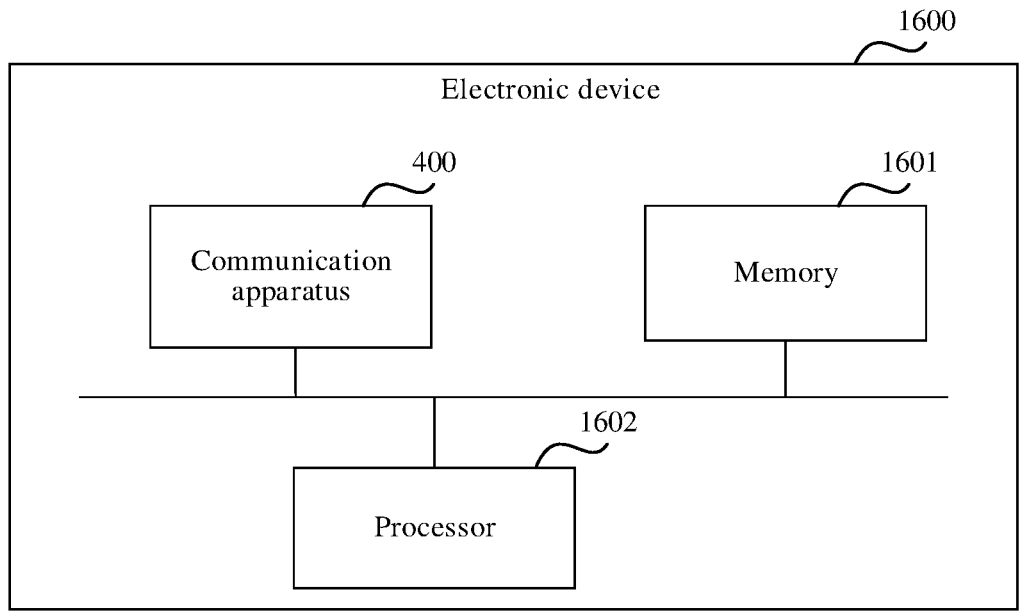
FIG. 16 is a schematic diagram of a structure of an electronic device according to an embodiment of this application.

Based on a same invention concept, an embodiment of this application further provides an electronic device. As shown in FIG. 16, the electronic device 1600 includes a memory 1601, a processor 1602, and the communication apparatus 400.

Figure 17:
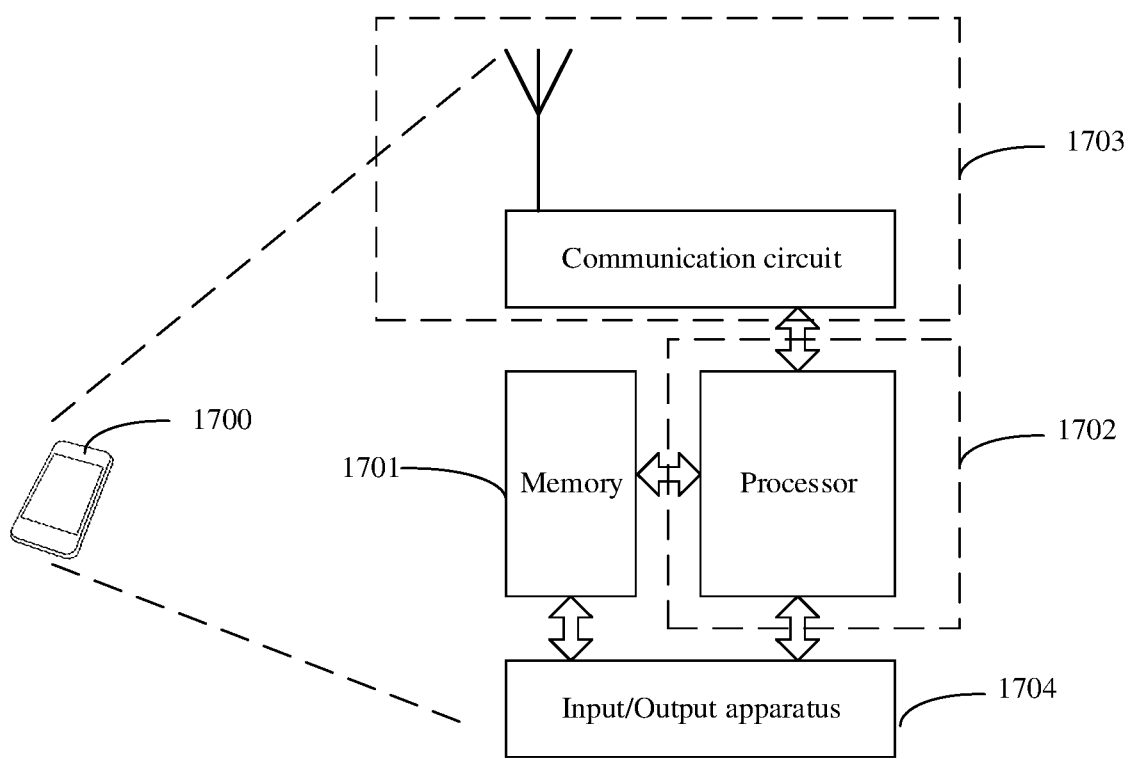
FIG. 17 is a schematic diagram of a structure of a terminal device according to an embodiment of this application.

It should be understood that the electronic device 1600 herein may be specifically a terminal device such as a smartphone, a computer, or a smart watch. A smartphone 1700 shown in FIG. 17 is used as an example of the terminal device. The smartphone may specifically include a memory 1701, a processor 1702, a communication circuit 1703, and an input/output apparatus 1704. The processor 1702 is mainly configured to process a communication protocol and communication data, control the entire smartphone, execute a software program, and process data of the software program. The memory 1701 is mainly configured to store the software program and data. The communication circuit 1703 is mainly configured to perform conversion between a baseband signal and a radio frequency signal and processing of the radio frequency signal. The communication circuit 1703 may be considered as the communication apparatus 400. The communication circuit 1703 is mainly configured to send and receive a radio frequency signal in a form of an electromagnetic wave. The input/output apparatus 1704, such as a touchscreen, a display screen, or a keyboard, is mainly configured to receive data input by a user and output data to the user.

After the smartphone 1700 is powered on, the processor 1702 may read the software program in the memory 1701, interpret and execute instructions of the software program, and process the data of the software program. When data needs to be sent wirelessly, the processor 1702 performs baseband processing on the data to be sent, and then outputs a baseband signal to the communication circuit 1703. The communication circuit 1703 performs radio frequency processing on the baseband signal, and then sends out a radio frequency signal through the antenna in a form of an electromagnetic wave. When data is sent to the smartphone 1700, the communication circuit 1703 receives a radio frequency signal through the antenna, converts the radio frequency signal into a baseband signal, and outputs the baseband signal to the processor 1702. The processor 1702 converts the baseband signal into data, and processes the data.

A person skilled in the art may understand that, for ease of description, FIG. 17 shows only one memory and one processor. In an actual terminal device, there may be a plurality of processors and a plurality of memories. The memory may also be referred to as a storage medium, a storage device, or the like. It should be noted that, a type of the memory is not limited in embodiments of this application.

It should be understood that an Xth band mentioned in embodiments of this application, for example, the first band and the second band, is a fixed frequency range defined by a standardization organization or commercially used, and includes but is not limited to the 5G millimeter wave band defined by 3GPP in embodiments of this application, for example, n257 (26.5 GHz-29.500 GHz), n260 (37 GHz-40 GHz), n258 (24.25 GHz-27.5 GHz), and n261 (27.5 GHz-28.35 GHz).

It should be understood that the signal of the Xth band mentioned in embodiments of this application, for example, the signal of the first band or the signal of the second band, is a signal transmitted on the Xth band. The signal may be a signal transmitted using an entire bandwidth or a partial bandwidth in the Xth band. For example, a corresponding signal of the n257 band includes but is not limited to a signal 1 whose frequency range is 26.5 G-27 G, a signal 2 whose frequency range is 27 G-28 G, a signal 3 whose frequency range is 27 G-29.5 G, and a signal 4 whose frequency range is 26.5 G-29.5 G.

It should be understood that the word "coupling" mentioned in embodiments of this application indicates interworking or interaction between different components, and may include a direct connection or an indirect connection via another component. For example, that an XX end is coupled to ground indicates that the XX end may be directly coupled to ground, or may be coupled to ground via another component.

Obviously, a person skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. An apparatus, comprising:
   a transceiver coupled to a plurality of radio frequency channels, wherein the plurality of radio frequency channels are coupled to all antennas in an antenna array in a one-to-one manner, each of the plurality of radio frequency channels comprises a phase shifter, and each phase shifter is configured to set a phase of a radio frequency signal transmitted in the radio frequency channel in which the phase shifter is comprised; and the antenna array, wherein the antenna array comprises a plurality of first antennas and a plurality of second antennas, the plurality of first antennas is configured to transmit a plurality of radio frequency signals of a first band, to form a first carrier signal pointing to a first direction, the plurality of second antennas is configured to transmit a plurality of radio frequency signals of a second band, to form a second carrier signal pointing to a second direction, and an inter-band carrier aggregation signal comprises the first carrier signal and the second carrier signal.

2. The apparatus according to claim 1, wherein the first direction points to a first network device, and the second direction points to a second network device.

3. The apparatus according to claim 1, wherein:

the plurality of second antennas is further configured to transmit the plurality of radio frequency signals of the first band, and the plurality of first antennas is further configured to transmit the plurality of radio frequency signals of the first band, to form a third carrier signal pointing to the first direction.

4. The apparatus according to claim 1, wherein:

the plurality of first antennas are further configured to transmit the plurality of radio frequency signals of the second band, and the plurality of second antennas are further configured to transmit the plurality of radio frequency signals of the second band, to form a fourth carrier signal pointing to the second direction.

5. The apparatus according to claim 1, wherein the transceiver comprises a power splitting and combining network, and a signal processing circuit;

wherein the power splitting and combining network is coupled to the plurality of radio frequency channels, and is configured to connect a plurality of first radio frequency channels to the signal processing circuit, and connect a plurality of second radio frequency channels to the signal processing circuit; and wherein the plurality of first radio frequency channels are coupled to the plurality of first antennas, and the plurality of second radio frequency channels are coupled to the plurality of second antennas.

6. The apparatus according to claim 5, wherein the signal processing circuit comprises a first signal processing circuit and a second signal processing circuit, the first signal processing circuit comprises a first sent signal processing circuit and a first received signal processing circuit, and the second signal processing circuit comprises a second sent signal processing circuit and a second received signal processing circuit.

7. The apparatus according to claim 6, wherein the first sent signal processing circuit comprises a first transmit amplifier, and the first received signal processing circuit comprises a first receive amplifier; and the second sent signal processing circuit comprises a second transmit amplifier, and the second received signal processing circuit comprises a second receive amplifier.

8. The apparatus according to claim 7, wherein the first sent signal processing circuit further comprises a first up-converter connected in series to the first transmit amplifier, the first received signal processing circuit further comprises a first down-converter connected in series to the first receive amplifier, the second sent signal processing circuit further comprises a second up-converter connected in series to the second transmit amplifier, and the second received signal processing circuit further comprises a second down-converter connected in series to the second receive amplifier.

9. The apparatus according to claim 8, wherein each radio frequency channel of the plurality of radio frequency channels comprises:

a front-end device, wherein the front-end device comprises a low noise amplifier (LNA) and a power amplifier (PA) that are connected in parallel, the LNA is configured to amplify a received signal of the antenna array, and the PA is configured to amplify a sent signal of the antenna array; and wherein in each radio frequency channel of the plurality of radio frequency channels the phase shifter comprised in the radio frequency channel is coupled to the front-end device comprised in the radio frequency channel.

10. The apparatus according to claim 5, wherein the power splitting and combining network comprises:

a first power splitter-combiner configured to implement power splitting and combining on the plurality of first radio frequency channels;

a second power splitter-combiner configured to implement power splitting and combining on the plurality of second radio frequency channels; and a switch configured to control coupling or disconnection between the first power splitter-combiner and the signal processing circuit, and control coupling or disconnection between the second power splitter-combiner and the signal processing circuit.

11. The apparatus according to claim 10, wherein the switch is configured to:

control connection and disconnection between the first power splitter-combiner and a first signal processing circuit;

control connection and disconnection between the first power splitter-combiner and a second signal processing circuit;

control connection and disconnection between the second power splitter-combiner and the first signal processing circuit; and control connection and disconnection between the second power splitter-combiner and the second signal processing circuit.

12. The apparatus according to claim 11, wherein the switch comprises:

a switch circuit, wherein the switch circuit comprises a first switch and a second switch, wherein the first switch is configured to connect the first power splitter-combiner to a third power splitter-combiner or a fourth power splitter-combiner, and the second switch is configured to connect the second power splitter-combiner to the third power splitter-combiner or the fourth power splitter-combiner;

the third power splitter-combiner configured to connect the switch circuit to the first signal processing circuit; and the fourth power splitter-combiner configured to connect the switch circuit to the second signal processing circuit.

13. The apparatus according to claim 5, wherein each radio frequency channel of the plurality of radio frequency channels comprises a first switch, a first input channel, a second input channel, a first output channel, a second output channel, and the phase shifter; and wherein each first switch is configured to switch on the first input channel or the second input channel of the radio frequency channel in which the first switch is comprised, and switch on the first output channel or the second output channel of the radio frequency channel in which the first switch is comprised, each first input channel comprises a first low noise amplifier (LNA) and a first mixer that are connected in series, each second input channel comprises a second LNA and a second mixer that are connected in series, each first output channel comprises a first power amplifier (PA) and a third mixer that are connected in series, each second output channel comprises a second PA and a fourth mixer that are connected in series, and each phase shifter is coupled to an input end of each mixer in the radio frequency channel in which the phase shifter is comprised.

14. The apparatus according to claim 13, wherein each first LNA and each first mixer are configured to receive and process the radio frequency signals of the first band, each second LNA and each second mixer are configured to receive and process the radio frequency signals of the second band, each first PA and each third mixer are configured to process and send the radio frequency signals of the first band, and each second PA and each fourth mixer are configured to process and send the radio frequency signals of the second band.

15. The apparatus according to claim 13, wherein the power splitting and combining network comprises:
   a first power splitter-combiner configured to implement power splitting and combining on each input channel of the plurality of first radio frequency channels;
   a second power splitter-combiner configured to implement power splitting and combining on each input channel of the plurality of second radio frequency channels;
   a third power splitter-combiner configured to implement power splitting and combining on each output channel of the plurality of first radio frequency channels;
   a fourth power splitter-combiner configured to implement power splitting and combining on each output channel of the plurality of second radio frequency channels; and
   a second switch configured to control connection between the first power splitter-combiner and a first received signal processing circuit, control connection between the third power splitter-combiner and a first sent signal processing circuit, control connection between the second power splitter-combiner and the first received signal processing circuit or a second received signal processing circuit, and control connection between the fourth power splitter-combiner and the first sent signal processing circuit or a second sent signal processing circuit.

16. The apparatus according to claim 15, wherein the second switch comprises:
   a first switch circuit, coupled to the second power splitter-combiner, a fifth power splitter-combiner, and the second received signal processing circuit, and configured to connect the second power splitter-combiner to the fifth power splitter-combiner, or connect the second power splitter-combiner to the second received signal processing circuit;
   a second switch circuit, coupled to the fourth power splitter-combiner, a sixth power splitter-combiner, and the second sent signal processing circuit, and configured to connect the fourth power splitter-combiner to the sixth power splitter-combiner, or connect the fourth power splitter-combiner to the second sent signal processing circuit;
   the fifth power splitter-combiner, coupled to the first power splitter-combiner, the first switch circuit, and the first received signal processing circuit, and configured to connect the first power splitter-combiner and the second power splitter-combiner to the first received signal processing circuit, or connect the first power splitter-combiner to the first received signal processing circuit; and
   the sixth power splitter-combiner, coupled to the third power splitter-combiner, the second switch circuit, and the first sent signal processing circuit, and configured to connect the third power splitter-combiner and the fourth power splitter-combiner to the first sent signal processing circuit, or connect the third power splitter-combiner to the first sent signal processing circuit.

17. The apparatus according to claim 16, wherein the first received signal processing circuit comprises a first amplifier, and the first sent signal processing circuit comprises a second amplifier; and the second received signal processing circuit comprises a third amplifier, and the second sent signal processing circuit comprises a fourth amplifier; and
   wherein an input end of the first amplifier is coupled to the fifth power splitter-combiner, an output end of the second amplifier is coupled to the sixth power splitter-combiner, and an output end of the first amplifier is coupled to an input end of the second amplifier; and an input end of the third amplifier is coupled to the fifth power splitter-combiner, an output end of the fourth amplifier is coupled to the sixth power splitter-combiner, and an output end of the third amplifier is coupled to an input end of the fourth amplifier.

18. The apparatus according to claim 1, wherein the first band and the second band are millimeter wave bands.

19. The apparatus according to claim 1, wherein the antenna array further comprises:
   a third antenna, wherein the third antenna is configured to isolate the plurality of first antennas from the plurality of second antennas.

20. An electronic device, comprising:
   a memory;
   a processor; and
   an apparatus comprising:
      a transceiver coupled to a plurality of radio frequency channels, wherein the plurality of radio frequency channels are coupled to all antennas in an antenna array in a one-to-one manner, each of the plurality of radio frequency channels comprises a phase shifter, and each phase shifter is configured to set a phase of a radio frequency signal transmitted in the radio frequency channel in which the phase shifter is comprised; and
      the antenna array, wherein the antenna array comprises a plurality of first antennas and a plurality of second antennas, the plurality of first antennas is configured to transmit a plurality of radio frequency signals of a first band, to form a first carrier signal pointing to a first direction, the plurality of second antennas is configured to transmit a plurality of radio frequency signals of a second band, to form a second carrier signal pointing to a second direction, and an interband carrier aggregation signal comprises the first carrier signal and the second carrier signal.

* * * * *